(12) United States Patent
Taira et al.

(10) Patent No.: US 9,964,324 B2
(45) Date of Patent: May 8, 2018

(54) CONTROLLER CIRCUIT FOR AIR CONDITIONER WITH COOL AIR GUIDED WITH ROOM TEMPERATURE AIRSTREAM

(71) Applicant: FUJITSU GENERAL LIMITED, Kawasaki-shi, Kanagawa (JP)

(72) Inventors: Ritsushi Taira, Kanagawa (JP); Shinji Sugiyama, Kanagawa (JP); Kenji Haruyama, Kanagawa (JP); Syun Iwano, Kanagawa (JP); Fumiaki Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 748 days.

(21) Appl. No.: 13/872,816

(22) Filed: Apr. 29, 2013

(65) Prior Publication Data
US 2013/0284417 A1 Oct. 31, 2013

(30) Foreign Application Priority Data

Apr. 27, 2012 (JP) .................................. 2012-103523

(51) Int. Cl.
F24F 11/00 (2006.01)
F24F 1/00 (2011.01)

(52) U.S. Cl.
CPC ........ *F24F 11/0076* (2013.01); *F24F 1/0033* (2013.01); *F24F 11/0034* (2013.01); *F24F 11/0078* (2013.01); *F24F 2001/0048* (2013.01)

(58) Field of Classification Search
CPC . F24F 11/0078; F24F 2011/0035; F24F 13/06
See application file for complete search history.

(56) References Cited

U.S. PATENT DOCUMENTS 2,000,597 A * 5/1935 Keyes ...................... F24F 1/01
165/123
2,235,500 A 3/1941 Kitchen
(Continued)

FOREIGN PATENT DOCUMENTS

CN 1536279 A 10/2004
DE 102011112109 A1 3/2013
(Continued)

OTHER PUBLICATIONS

Entire Prosecution History of U.S. Appl. No. 13/872,830, filed Apr. 29, 2013, entitled "Air Conditioner".
(Continued)

*Primary Examiner* — Ljiljana Ciric
*Assistant Examiner* — Alexis Cox
(74) *Attorney, Agent, or Firm* — McDermott Will & Emery LLP

(57) ABSTRACT

A first fan controlling section of a controller circuit is configured to control a first blower fan so as to induce the discharge of the airflow of a cool air through a first air outlet defined in a first enclosure of an indoor unit of the air conditioner. A second fan controlling section is configured to control second blower fans so as to induce the discharge of the airflows of a room air through second air outlets, respectively, defined in a pair of second enclosures disposed on the opposite sides of the first enclosure. An enclosure attitude controlling section is configured to change the respective attitude of the second enclosures relative to the first enclosure.

6 Claims, 18 Drawing Sheets

(56) References Cited

U.S. PATENT DOCUMENTS

| | | | | |
|---|---|---|---|---|
| 2,640,412 | A * | 6/1953 | Sweger | F24F 13/06 454/317 |
| 2,977,870 | A * | 4/1961 | Bierwirth | F24D 5/04 237/46 |
| 2,999,370 | A | 9/1961 | Eberhart | |
| 3,659,352 | A * | 5/1972 | Cook | F26B 9/06 34/191 |
| 5,014,610 | A * | 5/1991 | Twito | F24F 13/15 454/313 |
| 5,242,325 | A | 9/1993 | Nukushina | |
| 5,251,814 | A | 10/1993 | Warashina et al. | |
| 5,326,028 | A * | 7/1994 | Kano | F24F 11/0034 236/49.3 |
| 5,467,606 | A | 11/1995 | Sasaki et al. | |
| 5,547,018 | A * | 8/1996 | Takahashi | F24F 1/0011 165/122 |
| 6,283,380 | B1 * | 9/2001 | Nakanishi | F24F 11/053 236/49.3 |
| 6,338,382 | B1 * | 1/2002 | Takahashi | F24F 1/0007 165/119 |
| 9,250,028 | B2 | 2/2016 | Taira et al. | |
| 2005/0279120 | A1 * | 12/2005 | Lee | F24F 1/0007 62/419 |
| 2005/0284170 | A1 | 12/2005 | Lee et al. | |
| 2008/0014855 | A1 * | 1/2008 | Leserre | B60H 1/3414 454/155 |
| 2008/0242212 | A1 * | 10/2008 | El-Galley | F24F 7/06 454/258 |
| 2008/0242214 | A1 * | 10/2008 | Sung | F24F 13/06 454/284 |
| 2009/0107167 | A1 | 4/2009 | Kim et al. | |
| 2009/0114377 | A1 | 5/2009 | Zheng et al. | |
| 2009/0183521 | A1 * | 7/2009 | Shibuya | F24F 1/0007 62/259.1 |
| 2010/0132393 | A1 | 6/2010 | Kim et al. | |
| 2010/0168923 | A1 * | 7/2010 | Park | F24F 11/0034 700/278 |
| 2011/0039491 | A1 * | 2/2011 | Khalifa | F24F 13/04 454/305 |
| 2011/0048050 | A1 * | 3/2011 | Moteki | F24F 1/0007 62/263 |
| 2012/0031983 | A1 * | 2/2012 | Shirota | F24F 1/0011 236/49.3 |
| 2012/0057973 | A1 * | 3/2012 | Chen | F04D 25/0613 415/213.1 |
| 2013/0167578 | A1 | 7/2013 | Ikeda et al. | |
| 2013/0242504 | A1 * | 9/2013 | Cartes | G05D 23/1931 361/679.49 |
| 2013/0255909 | A1 * | 10/2013 | Matsumoto | F28F 27/00 165/11.1 |
| 2013/0284410 | A1 * | 10/2013 | Taira | F24F 1/0033 165/121 |
| 2013/0284411 | A1 * | 10/2013 | Taira | F24F 1/0033 165/121 |
| 2014/0041145 | A1 * | 2/2014 | Matsumoto | A47L 9/2894 15/319 |
| 2015/0174987 | A1 * | 6/2015 | Lee | B60H 1/00671 454/155 |
| 2015/0338123 | A1 | 11/2015 | Iwano | |
| 2015/0345809 | A1 * | 12/2015 | Hayashi | F24F 13/20 165/121 |
| 2015/0354850 | A1 * | 12/2015 | Iwano | F24F 13/15 454/256 |
| 2015/0377242 | A1 * | 12/2015 | Furuhashi | F24F 11/0078 415/148 |
| 2016/0101668 | A1 * | 4/2016 | Doll | F24F 13/072 454/155 |

FOREIGN PATENT DOCUMENTS

| | | | |
|---|---|---|---|
| EP | 1726889 | A1 | 11/2006 |
| EP | 1813880 | A1 | 8/2007 |
| EP | 2208946 | A1 | 7/2010 |
| EP | 2416074 | A2 | 2/2012 |
| JP | 55121342 | | 9/1980 |
| JP | 5-69521 | | 9/1993 |
| JP | 2000-297792 | A | 10/2000 |
| JP | 2002-022198 | A | 1/2002 |
| JP | 2002-130718 | A | 5/2002 |
| JP | 2003-130381 | A | 5/2003 |
| JP | 2003185168 | A * | 7/2003 |
| JP | 2004-286235 | A | 10/2004 |
| JP | 2008-281212 | A | 11/2008 |
| JP | 2010-164271 | A | 7/2010 |
| JP | 2011-069524 | A | 4/2011 |
| JP | 2012-078031 | A | 4/2012 |

OTHER PUBLICATIONS

Entire Prosecution History of U.S. Appl. No. 13/872,875, filed Apr. 29, 2013, entitled "Air Conditioner".
Extended European Search Report EP 13 16 5503 dated Oct. 18, 2013.
Notification of the First Office Action issued in corresponding Chinese Patent Application No. 201310153486.8, dated Sep. 5, 2016; with English translation.
Non-final Office Action issued in related U.S. Appl. No. 13/872,830, dated Jul. 8, 2015.
Final Office Action issued in related U.S. Appl. No. 13/872,830, dated Dec. 24, 2015.
Non-final Office Action issued in related U.S. Appl. No. 13/872,875, dated Jun. 22, 2015.
Notice of Allowance issued in related U.S. Appl. No. 13/872,875, dated Oct. 2, 2015.
International Search Report and Written Opinion, issued in International Patent Application No. PCT/JP2013/085043, dated Apr. 8, 2014; with English translation.
International Preliminary Report on Patentability issued in International Patent Application No. PCT/JP2013/085043, dated Jun. 30, 2015; with English translation.
International Search Report and Written Opinion, issued in International Patent Application No. PCT/JP2013/085044, dated Apr. 8, 2014; with English translation.
International Preliminary Report on Patentability issued in International Patent Application No. PCT/JP2013/085044, dated Jun. 30, 2015; with English translation.
International Search Report and Written Opinion, issued in International Patent Application No. PCT/JP2013/085045, dated Mar. 4, 2014; with English translation.
International Preliminary Report on Patentability issued in International Patent Application No. PCT/JP2013/085045, dated Jun. 30, 2015; with English translation.
Office Action issued in Japanese Patent Application No. 2012-103521, dated Jan. 20, 2016; with English translation.
Office Action issued in Japanese Patent Application No. 2012-103523, dated Mar. 16, 2016; with English translation.

* cited by examiner

CONTROLLER CIRCUIT FOR AIR CONDITIONER WITH COOL AIR GUIDED WITH ROOM TEMPERATURE AIRSTREAM

CROSS-REFERENCE TO RELATED APPLICATION

This application is based upon and claims the benefit of priority from the prior Japanese Patent Application No. 2012-103523 filed on Apr. 27, 2012, the entire contents of which are incorporated herein by reference.

FIELD

The present invention relates to a controller circuit for an air conditioner and program instructions for controlling an air conditioner.

BACKGROUND

An air conditioner is configured to generate a cool or warm air through heat exchange for making an airflow of the cool or warm air out of an air outlet of an indoor unit. As disclosed in Japanese Patent Application Publication Nos. 2008-281212 and 2003-130381, some air conditioners include second air outlets beside the air outlet all formed in an enclosure of the indoor unit. The second air outlets are utilized to make an additional airflow of the cool or warm air. The indoor unit is allowed to spread the cool or warm air over a wider area as compared with an indoor unit having a single air outlet.

In general, the indoor unit includes horizontal flaps and vertical louvers at the air outlet. The horizontal flaps and the vertical louvers are utilized to regulate the direction of the outgoing airflow. However, once the airflow is released from the air outlet, the direction and movement of the airflow afterward depend on the natural convection. If such direction and movement of the airflow can be controlled more delicately, a comfortable temperature environment one has not ever experienced can be established in a room.

SUMMARY

One aspect of the present invention may provide a controller circuit for an air conditioner and program instructions for controlling an air conditioner contributing to establishment of a comfortable temperature environment.

According to one aspect of the present invention, there is provided a controller circuit for an air conditioner, comprising: a cooling establishment section outputting a control signal configured to establish the action of a cooling operation; a first fan controlling section configured to control a first blower fan so as to induce the discharge of the airflow of a cool air through a first air outlet defined in a first enclosure of an indoor unit of the air conditioner; a second fan controlling section configured to control second blower fans so as to induce the discharge of the airflows of a room air through second air outlets, respectively, defined in a pair of second enclosures disposed on the opposite sides of the first enclosure; and an enclosure attitude controlling section configured to control a driving mechanism changing respective attitude of the second enclosures relative to the first enclosure.

The cooling operation is established in the refrigerant circuit of the air conditioner in response to the supply of the control signal. When the first blower fan is in operation, the airflow of the cool air is discharged out of the first air outlet of the indoor unit. When the second blower fans are in operation, the airflows of the room air are discharged out of the second air outlets. The performance of the driving mechanism enables the airflow of the room air running directly to the human being in the room. The second blower units are thus allowed to function as a simple fan or blower without a heat exchange. The human being is capable of enjoying the cooling effect resulting from not only a reduction in the room temperature but also heat radiation from the skin through the contact of the airflow.

The enclosure attitude controlling section may be configured to determine the respective attitude of the second enclosures based on the detect signal output from a human sensor detecting the presence of a human being in a room. The human sensor contributes to establishment of the airflow from the second air outlet directed to the human being in the room. The human sensor may be utilized to allow the airflow of the room air to follow the movement of the human being in the room. Even when the human being moves in the room, the airflow of the room air keeps reaching the human being moving in the room. The human being in the room is reliably allowed to enjoy the cooling effect resulting from the contact of the airflow.

The enclosure attitude controlling section may be configured to separately independently control the respective attitude of the second enclosures. The respective attitude of the second enclosures can be controlled appropriately in accordance with the number and locations of the human being in the room. The separate individual fan units are capable of forming the separate airflow of the room air accurately directed to the human being.

The enclosure attitude controlling section may be configured to determine the respective attitude of the second enclosures in an attitude enabling the airflow of the room air running in a horizontal direction or an ascendant direction from the second air outlets when the airflow of the cool air is discharged in a horizontal direction from the first air outlet. The airflow of the room air contributes to generation of a moderate flow of air in the room. The human being in the room is allowed to enjoy a comfortable cooled condition with a slow airstream of the convection.

The flow rate of the airflow of the room air may be set larger than that of the airflow of the cool air. The airflow of the cool air is caught in the airflow of the room air having a larger flow rate. Accordingly, the airflow of the cool air is conveyed farther with the assistance of the airflow of the room air. Even when the flow rate of the airflow of the cool air gets smaller, the airflow of the cool air can reach farther locations. Even though the flow rate of air is reduced, the room is cooled in an efficient manner.

According to another aspect of the present invention, there is provided a controller circuit for an air conditioner, comprising: a heating establishment section outputting a control signal configured to establish the action of a heating operation; a first fan controlling section configured to control a first blower fan so as to induce the discharge of the airflow of a warm air through a first air outlet defined in a first enclosure of an indoor unit of the air conditioner; a second fan controlling section configured to control second blower fans so as to induce the discharge of the airflows of a room air through second air outlets, respectively, defined in a pair of second enclosures disposed on the opposite sides of the first enclosure; and an enclosure attitude controlling section configured to control a driving mechanism changing respective attitude of the second enclosures relative to the first enclosure, the enclosure attitude controlling section configured to determine the direction of the airflows of the room air in an ascendant direction relative to the direction of the airflow of the warm air.

The heating operation is established in the refrigerant circuit of the air conditioner in response to the supply of the control signal. When the first blower fan is in operation, the airflow of the warm air is discharged out of the first air outlet of the indoor unit. When the second blower fans are in operation, the airflows of the room air are discharged out of the second air outlets. The airflows of the room air may be utilized to restrict the direction and/or movement of the airflow of the warm air. The warm air can be conveyed to any desirable locations in the room. The temperature environment is in this manner efficiently enhanced or improved in the room.

The enclosure attitude controlling section may be configured to determine the respective attitude of the second enclosures in an attitude enabling the airflow of the room air running in a horizontal direction or an ascendant direction from the second air outlets when the airflow of the warm air is discharged in a descendant direction from the first air outlet. When the airflow of the warm air is guided in the descendant direction, the warm air is discharged toward the floor. The warm air tends to immediately lift up from the floor toward the ceiling when the room temperature is relatively low. Here, the airflows of the room air from the second air outlets serve to generate a convection or an airflow in the room catching the warm air flowing upward. The caught warm air is caused to fall downstream toward the floor. The warm air is allowed to sufficiently flow into the lower space of the room. Even though the entire space in the room cannot be heated, the human being in the room feels warmness.

The enclosure attitude controlling section may be configured to determine the respective attitude of the second enclosures in an attitude enabling the airflow of the room air running in a descendant direction or higher from the second air outlets from a position higher than the first air outlet. The airflows from the second air outlets flow downward above the airflow of the warm air. The airflows of the second air outlets serve to hold the warm air against the floor. The airflow thus prevents the warm air from flowing upward. The human being in the room is allowed to feel the warmness at his/her feet.

According to still another aspect of the present invention, there is provided a computer-readable storage medium containing program instructions for controlling an air conditioner, comprising: computer program code causing a processor to output a control signal configured to establish the action of a cooling operation; computer program code causing a processor to output a first driving signal configured to drive a first blower fan so as to generate the airflow of a cool air to be discharged from a first air outlet defined in a first enclosure of an indoor unit of the air conditioner; computer program code causing a processor to output a second driving signal configured to drive a pair of second blower fans so as to generate the airflows of a room air discharged from second air outlets, respectively, defined in a pair of second enclosures disposed on the opposite sides of the first enclosure; and computer program code causing a processor to output a third driving signal configured to drive a driving mechanism changing respective attitude of the second enclosures relative to the first enclosure.

The cooling operation is established in the refrigerant circuit of the air conditioner in response to the supply of the control signal. When the first blower fan is in operation in response to the supply of the first driving signal, the airflow of the cool air is discharged out of the first air outlet of the indoor unit. When the second blower fans are in operation in response to the supply of the second driving signal, the airflows of the room air are discharged out of the second air outlets. The performance of the driving mechanism in response to the supply of the third driving signal enables the airflow of the room air running directly to the human being in the room. The second blower units are thus allowed to function as a simple fan or blower without a heat exchange. The human being is capable of enjoying the cooling effect resulting from not only a reduction in the room temperature but also heat radiation from the skin through the contact of the airflow.

According to still another aspect of the present invention, there is provided a computer-readable storage medium containing program instructions for controlling an air conditioner, comprising: computer program code causing a processor to output a control signal configured to establish the action of a heating operation; computer program code causing a processor to output a first driving signal configured to drive a first blower fan so as to generate the airflow of a warm air to be discharged from a first air outlet defined in a first enclosure of an indoor unit of the air conditioner; computer program code causing a processor to output a second driving signal configured to drive a pair of second blower fans so as to generate the airflows of a room air discharged from second air outlets, respectively, defined in a pair of second enclosures disposed on opposite sides of the first enclosure; and computer program code causing a processor to output a third driving signal configured to drive a driving mechanism changing the respective attitude of the second enclosures relative to the first enclosure so as to set the direction of the airflows of the room air in an ascendant direction relative to the direction of the airflow of the warm air.

The heating operation is established in the refrigerant circuit of the air conditioner in response to the supply of the control signal. When the first blower fan is in operation in response to the supply of the first driving signal, the airflow of the warm air is discharged out of the first air outlet of the indoor unit. When the second blower fans are in operation in response to the supply of the second driving signal, the airflows of the room air are discharged out of the second air outlets. When the driving signal is operated in response to the supply of the third driving signal, the airflows of the room air may be utilized to restrict the direction and/or movement of the airflow of the warm air. The warm air can be conveyed to any desirable locations in the room. The temperature environment is in this manner efficiently enhanced or improved in the room.

The object and advantages of the embodiment will be realized and attained by means of the elements and combinations particularly pointed out in the appended claims. It is to be understood that both the foregoing general description and the following detailed description are exemplary and explanatory and are not restrictive of the embodiment, as claimed.

DESCRIPTION OF EMBODIMENT

Figure 1:
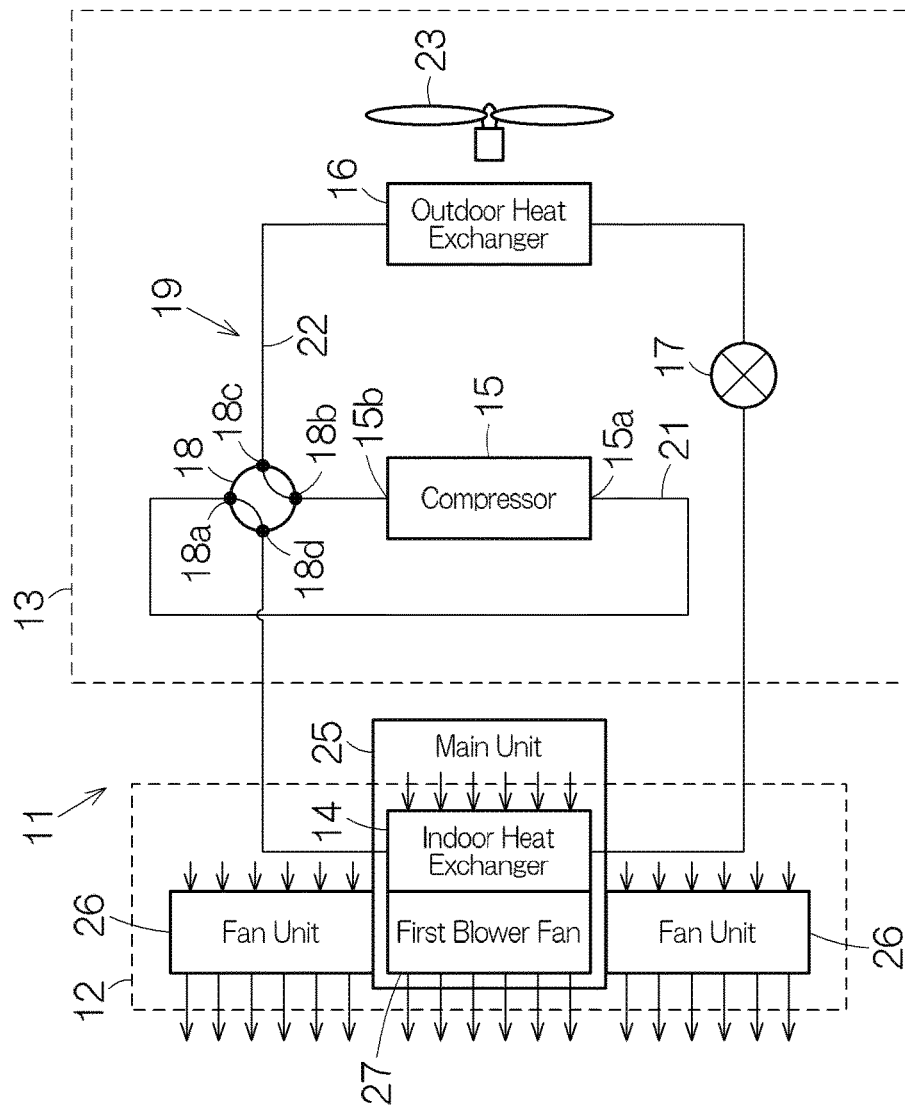
FIG. 1 is a schematic view illustrating the structure of an air conditioner according to one embodiment of the present invention.

FIG. 1 schematically illustrates the structure of an air conditioner 11 according to one embodiment of the present invention. The air conditioner 11 includes an indoor unit 12 and an outdoor unit 13. The indoor unit 12 is located in a room space in a building, for example. Otherwise, the indoor unit 12 may be located in an environmental space equivalent to the room space. An indoor heat exchanger 14 is assembled in the indoor unit 12. A compressor 15, an outdoor heat exchanger 16, an expansion valve 17 and a four-way valve 18 are assembled in the outdoor unit 13. A refrigerant circuit 19 is established with a combination of the indoor heat exchanger 14, the compressor 15, the outdoor heat exchanger 16, the expansion valve 17 and the four-way valve 18.

The refrigerant circuit 19 includes a first circulating path 21. The first circulating path 21 connects a first port 18a of the four-way valve 18 and a second port 18b of the four-way valve 18 to each other. A suction port 15a of the compressor 15 is connected to the first port 18a of the four-way valve 18 through a refrigerant piping. A gaseous refrigerant is supplied to the suction port 15a of the compressor 15 from the first port 18a. The compressor 15 is configured to compress the gaseous refrigerant of a low pressure to a predetermined higher pressure. A discharge port 15b of the compressor 15 is connected to the second port 18b of the four-way valve 18 through a refrigerant piping. The gaseous refrigerant is supplied to the second port 18b of the four-way valve 18 from the discharge port 15b of the compressor 15. A refrigerant piping such as a copper piping is utilized to form the first circulating path 21.

The refrigerant circuit 19 further includes a second circulating path 22. The second circulating path 22 connects a third port 18c of the four-way valve 18 and a fourth port 18d of the four-way valve 18 to each other. The outdoor heat exchanger 16, the expansion valve 17 and the indoor heat exchanger 14 are assembled in the second circulating path 22 in this sequence from the third port 18c. The outdoor heat exchanger 16 serves to exchange the thermal energy between the passing refrigerant and the ambient air. The indoor heat exchanger 14 serves to exchange the thermal energy between the passing refrigerant and the ambient air. A refrigerant piping such as a copper piping is utilized to form the second circulating path 22.

An outdoor unit fan 23 is assembled in the outdoor unit 13. The outdoor unit fan 23 is associated with the outdoor heat exchanger 16. The outdoor unit fan 23 is configured to drive the impeller for rotation, for example, so as to generate airflow. The airflow passes through the outdoor heat exchanger 16. The flow rate of the airflow passing through the outdoor heat exchanger 16 depends on the rotation speed of the impeller. The flow rate of the airflow is utilized to adjust the quantity of the thermal energy exchanged between the refrigerant and the ambient air at the outdoor heat exchanger 16.

The indoor unit 12 includes a main unit 25 and a pair of fan units 26. The indoor heat exchanger 14 and a first blower fan 27 are assembled in the main unit 25. The first blower fan 27 is associated with the indoor heat exchanger 14. The first blower fan 27 is configured to drive the impeller for rotation, for example, so as to generate airflow. The first blower fan 27 operates to induce the suction of the room air into the main unit 25. The room air passes through the indoor heat exchanger 14. The heat exchanger generates a cool air or a warm air which is discharged out of the main unit 25. The flow rate of the airflow passing through the indoor heat exchanger 14 depends on the rotation speed of the impeller. The flow rate of the airflow is utilized to adjust the quantity of the thermal energy exchanged between the refrigerant and the ambient air at the indoor head exchanger 14. The fan unit 26 is configured to suck the room air and to discharge the room air as it is, specifically without being intentionally cooled or heated.

When the refrigerant circuit 19 works in the cooling operation, the four-way valve 18 connects the second port 18b and the third port 18c to each other as well as the first port 18a and the fourth port 18d to each other. The refrigerant of a high temperature and a high pressure is supplied to the outdoor heat exchanger 16 from the discharge port 15b of the compressor 15. The refrigerant circulates through the outdoor heat exchanger 16, the expansion valve 17 and the indoor heat exchanger 14 in this sequence. The thermal energy of the refrigerant is released into the outdoor atmosphere at the outdoor heat exchanger 16. The refrigerant is decompressed to a low pressure at the expansion valve 17. The decompressed refrigerant absorbs heat from the ambient air at the indoor heat exchanger 14. A cool air is thus generated. The cool air is forced to flow into the room with the assistance of the action of the first blower fan 27.

When the refrigerant circuit 19 works in the heating operation, the four-way valve 18 connects the second port 18b and the fourth port 18d to each other as well as the first port 18a and the third port 18c to each other. The refrigerant of a high temperature and a high pressure is supplied to the indoor heat exchanger 14. The refrigerant circulates through the indoor heat exchanger 14, the expansion valve 17 and the outdoor heat exchanger 16 in this sequence. The thermal energy of the refrigerant is released to the ambient air at the indoor heat exchanger 14. A warm air is thus generated. The warm air is forced to flow into the room with the assistance of the action of the first blower fan 27. The refrigerant is decompressed to a low pressure at the expansion valve 17. The decompressed refrigerant absorbs heat from the ambient air at the outdoor heat exchanger 16. The refrigerant thereafter returns to the compressor 15.

Figure 2:
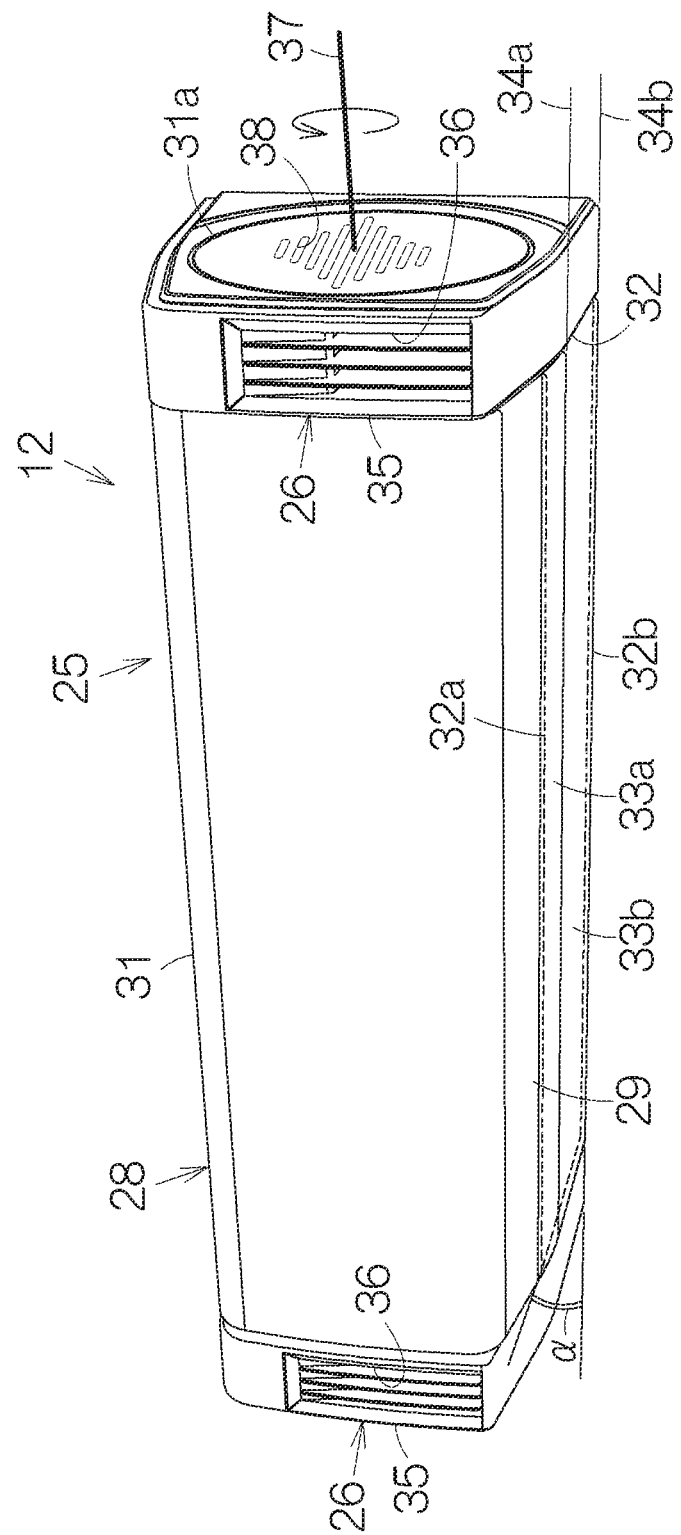
FIG. 2 is a perspective view schematically illustrating the structure of an indoor unit according to a first embodiment.

FIG. 2 schematically illustrates the indoor unit 12 according to a first embodiment. The main unit 25 of the indoor unit 12 includes a main enclosure 28. The main enclosure 28 includes an enclosure body 29 and an outer panel 31 covering over the enclosure body 29. A first air outlet 32 is defined in the enclosure body 29. A first air inlet, not depicted, is defined in the outer panel 31. The first air outlet 32 is an opening facing downward. The enclosure body 29 is mounted onto the wall of the room, for example. The first air outlet 32 has the front end 32a located at a level higher from the floor than the level of the rear end 32b. The first air outlet 32 thus takes an ascendant attitude by an ascending angle of α (alpha) relative to the horizontal plane. This ascending angle of α enables not only the discharge of the airflow directed downward toward the floor from the first air outlet 32 but also the discharge of the airflow in the horizontal direction in parallel with the floor.

A pair of horizontal flaps, namely front and rear horizontal flaps 33a, 33b are located in the first air outlet 32. The horizontal flaps 33a, 33b are configured to rotate around horizontal axes 34a, 34b, respectively. The horizontal axes 34a, 34b may be positioned at the rear ends of the horizontal flaps 33a, 33b. The horizontal flaps 33a, 33b serve to open and close the first air outlet 32 in response to the swinging movements of the horizontal flaps 33a, 33b.

Fan units 26 are disposed and mounted on the opposite side surfaces of the enclosure body 29, respectively. The fan units 26 are located outside the side walls of the enclosure body 29. Each of the fan units 26 includes an enclosure 35. A second air outlet 36 is defined in the enclosure 35 of the fan unit 26. The second air outlet 36 is allowed to move around a horizontal axis 37, as described later in detail. The horizontal axes 34a, 34b, 37 extend in parallel with one another. The side surface of the enclosure 35 is covered with a side panel 31a of the outer panel 31. A second air inlet 38 is defined in the side panel 31a. The second air inlet 38 may be a group of small openings, for example.

Figure 3:
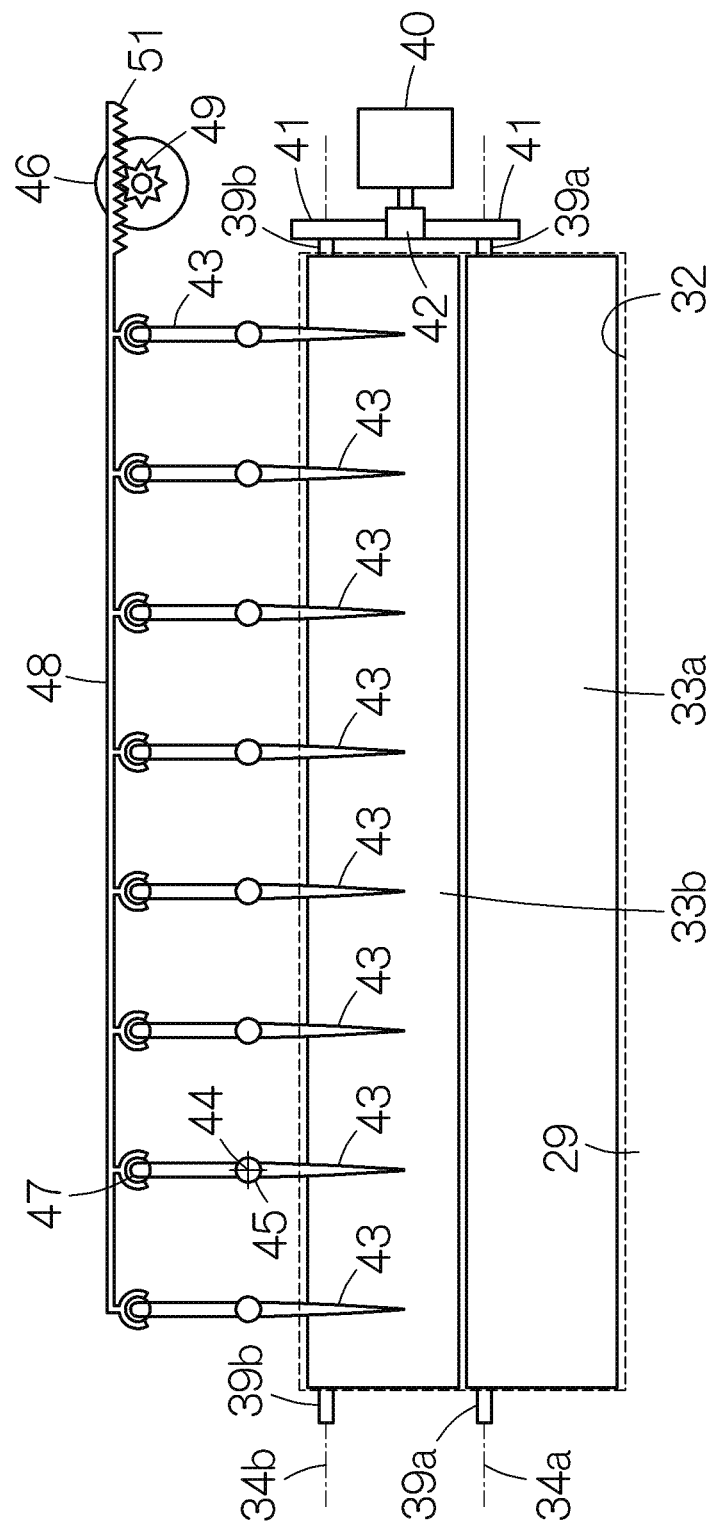
FIG. 3 is a plan view schematically illustrating horizontal flaps and vertical louvers in a main unit.

As depicted in FIG. 3, left and right protruding shafts 39a, 39b are formed on the horizontal flaps 33a, 33b in a manner coaxial with the horizontal axes 34a, 34b, respectively. The protruding shafts 39a, 39b protrude outward from the left and right ends of the horizontal flaps 33a, 33b into a space outside the contour of the first air outlet 32. The protruding shafts 39a, 39b are coupled to the enclosure body 29 for relative rotating movement around the horizontal axes 34a, 34b, respectively. The protruding shafts 39a, 39b may be received on bearings integral to the enclosure body 29, for example.

A flapping driving source 40 is connected to the protruding shafts 39a, 39b. The flapping driving source 40 may comprise an electric motor, for example. Follower gears 41 are fixed to the protruding shafts 39a, 39b, respectively, for example. A driving gear 42 is likewise fixed to the driving shaft of the electric motor. The driving gear 42 is engaged with the follower gears 41. The driving power of the electric motor is in this manner transmitted to the protruding shafts 39a, 39b at a predetermined transmission ratio. The flapping driving source 40 serves to induce the swinging movement of the horizontal flaps 33a, 33b.

Vertical louvers 43 are also attached to the first air outlet 32. The vertical louvers 43 are arranged along the horizontal axes 34a, 34b in the horizontal direction at equal intervals, for example. The individual vertical louver 43 is capable of rotating around a rotational axis 44. The rotational axis 44 extends within a vertical plane perpendicular to the horizontal axes 34a, 34b. All the rotational axes 44 are included within an imaginary plane extending in parallel with the horizontal axes 34a, 34b. The imaginary plane is preferably set perpendicular to an airflow passage leading to the first air outlet 32.

Protruding shafts 45 are formed on the individual vertical louver 43 in a manner coaxial with the corresponding rotational axis 44. The protruding shafts 45 protrude upward and/or downward from the upper and/or lower ends of the individual vertical louvers 43, for example. The protruding shafts 45 are coupled to the enclosure body 29 for relative rotating movement around the corresponding rotational axes 44, respectively. The protruding shafts 45 may be received on corresponding bearing units fixed to the enclosure body 29, for example.

A louver driving source 46 is connected to the protruding shafts 45. The louver driving source 46 may comprise an electric motor, for example. An engaging shaft 47 is formed on the individual vertical louver 43, for example. The engaging shaft 47 extends in parallel with the corresponding rotational axis 44 at a position offset from the corresponding rotational axis 44. A rack member 48 is connected to the engaging shafts 47 for relative rotating movement around the respective longitudinal axes of the engaging shafts 47. A driving gear 49 is fixed to the driving shaft of the electric motor. The driving gear 49 is engaged with teeth 51 of the rack member 48. The driving power or rotary movement of the electric motor is in this manner transformed to linear motion of the rack member 48. The rack member 48 serves to induce the swinging movement of the engaging shafts 47 around the corresponding rotational axes 44. The vertical louvers 43 are in this manner caused to move for rotation.

Figure 4:
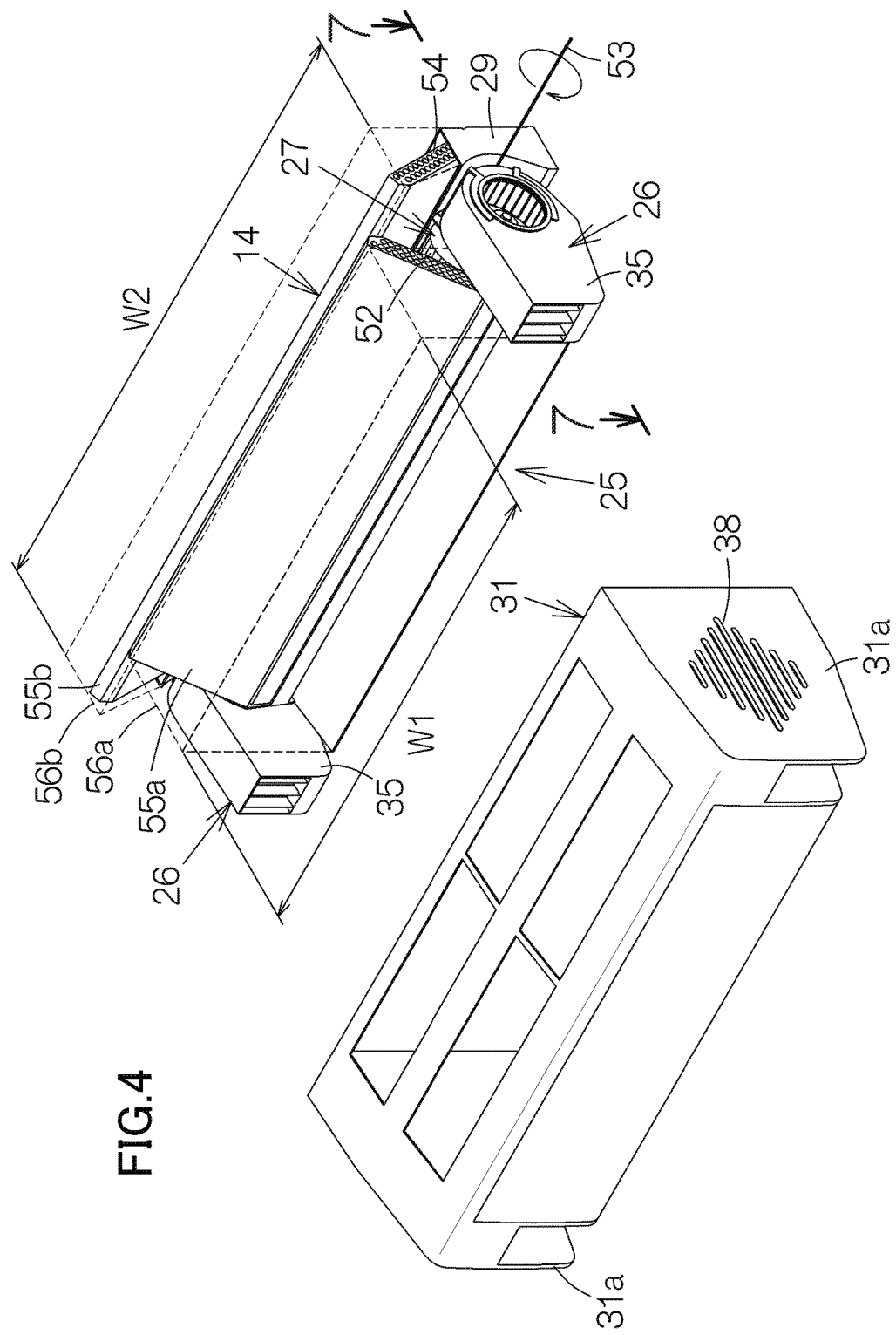
FIG. 4 is an exploded view of the main unit.

As depicted in FIG. 4, the indoor heat exchanger 14 and the first blower fan 27 are assembled into the enclosure body 29. The first blower fan 27 is at least partly enclosed in the enclosure body 29. A crossflow fan is employed as the first blower fan 27. The crossflow fan includes a rotor 52 locating blades along a cylindrical surface of an elongated cylinder. The rotor 52 is configured to rotate around a rotation axis 53 extending in parallel with the horizontal axes 34a, 34b. An airflow passage is defined in the enclosure body 29 for airflow from the first blower fan 27. The downstream end of the airflow passage forms the first air outlet 32.

The indoor heat exchanger 14 includes a refrigerant piping 54. The refrigerant piping 54 is made of a material having a high thermal conductivity such as copper. The refrigerant piping 54 is divided into a front section 55a and a rear section 55b. The front section 55a is disposed in a space interposed between the fan units 26. The rear section 55b is disposed in a space outside the space between the fan units 26. Specifically, the rear section 55b is contained within a space behind the space interposed between the fan units 26. Accordingly, the rear section 55b enters into spaces behind the individual fan units 26. As a result, the rear section 55b is allowed to expand wider in the lateral direction than the front section 55a is.

A front space 56a and a rear space 56b are defined in the main enclosure 28. The front space 56a is located between the fan units 26. The front space 56*a* has a first width W1 in parallel with the rotation axis 53 of the first blower fan 27. The front space 56*a* ends up at the opposite side walls of the enclosure body 29. The rear space 56*b* is formed behind the front space 56*a*. The rear space 56*b* extends into a space behind the individual fan units 26. The rear space 56*b* has a second width W2 in parallel with the rotation axis 53 of the first blower fan 27. The second width W2 is set larger than the first width W1. The front section 55*a* of the indoor heat exchanger 14 is accommodated in the front space 56*a*. The rear section 55*b* of the indoor heat exchanger 14 is accommodated in the rear space 56*b*. The front section 55*a* inclines backward to offset the upper end of the front section 55*a* toward the rear side of the enclosure body 29 in a space between the fan units 26. The rear section 55*b* inclines forward to offset the upper end of the rear section 55*b* toward the front side of the enclosure body 29. The indoor heat exchanger 14 in this manner allows establishment of a roughly V-shaped arrangement of the front section 55*a* and the rear section 55*b*. The first blower fan 27 is disposed in a space between the front section 55*a* and the rear section 55*b*. The upper end of the front section 55*a* is coupled to the upper end of the rear section 55*b*.

Figure 5:
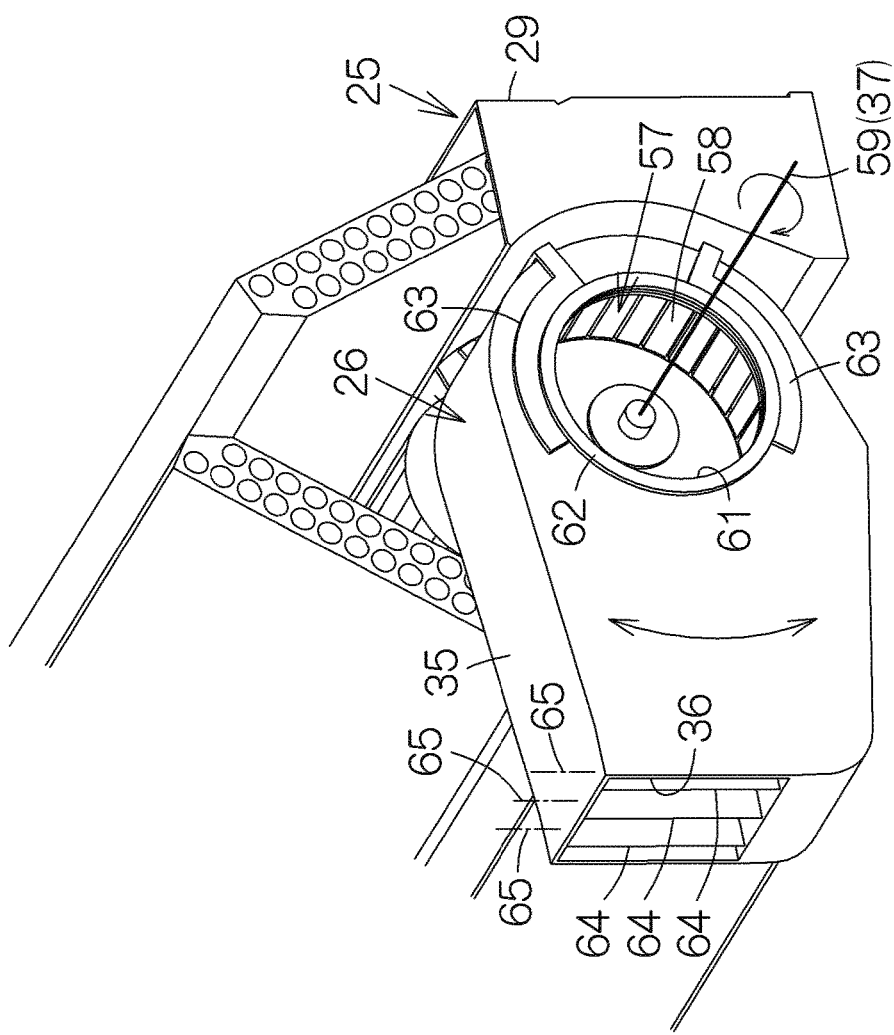
FIG. 5 is an enlarged perspective view of a fan unit.

As depicted in FIG. 5, a second blower fan 57 is enclosed in the enclosure 35 of each of the fan units 57. The second blower fan 57 is attached to the enclosure body 29. The second blower fan 57 is coupled to the corresponding side wall of the enclosure body 29. A sirocco fan is employed as the second blower fan 57. The sirocco fan includes a rotor 58 locating blades along a cylindrical surface of a cylinder. The rotor 58 is configured to rotate around a rotation axis 59 extending in parallel with the horizontal axes 34*a*, 34*b*.

An opening 61 is formed in the side wall of the enclosure 35. The opening 61 may have a circular contour coaxial with the rotation axis 59, for example. The size of the opening 61 is set smaller than the inner diameter of the cylinder locating the blades in the rotor 58. The second air inlet 38 in the side panel 31*a* is opposed to the opening 61. When the rotor 58 is driven to rotate, a room air is sucked into the interior of the rotor 58 through the second air inlet 38 and the opening 61 in the direction of the rotation axis 59. The sucked room air is pushed out in the centrifugal direction from the rotor 58. The pushed room air is guided to the second air outlet 36 along an airflow passage provided in the enclosure 35.

The fan unit 26 is supported on the main unit 25 for a relative attitude change to the main unit 25. Specifically, the enclosure 35 of the fan unit 26 is attached to the corresponding side surface of the enclosure body 29 in the main unit 25 for relative rotational movement around the horizontal axis 37 to the enclosure body 29. Here, the horizontal axis 37 may be aligned with the rotation axis 59 in a coaxial condition. An annular wall 62 is formed on the side surface or outer surface of the enclosure 35 in a manner coaxial with the horizontal axis 37. The annular wall 62 is supported on a pair of first brackets 63 for relative rotating movement. The annular wall 62 has the outward surface along the cylindrical surface. The first brackets 63 are configured to sandwich the cylindrical surface for relative sliding movement.

Vertical louvers 64 are attached to the second air outlet 36. Here, three of the vertical louvers 64 are supported on the enclosure 35, for example. The vertical louvers 64 are arranged in the horizontal direction at equal intervals, for example. The vertical louvers 64 are capable of rotating around corresponding rotation axes 65, respectively. The individual rotation axes 65 extend within vertical planes perpendicular to the horizontal axis 37, respectively. All the rotation axis 65 extend within an imaginary plane extending in parallel with the horizontal axis 37. The imaginary plane is preferably set perpendicular to an airflow passage leading to the second air outlet 36.

Figure 6:
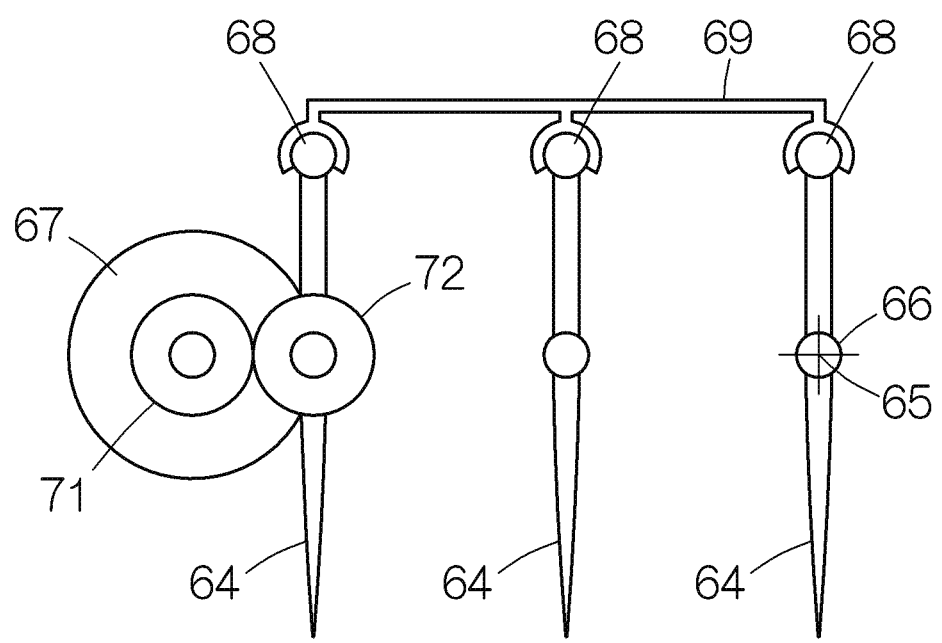
FIG. 6 is a plan view schematically illustrating vertical louvers in the fan unit.

As depicted in FIG. 6, protruding shafts 66 are formed on each of the vertical louvers 64 in a manner coaxial with the corresponding rotation axis 65. The protruding shafts 66 protrude upward and/or downward from the upper and/or lower ends of the individual vertical louver 64, for example. The protruding shafts 66 are coupled to the enclosure 35 for relative rotating movement around the corresponding rotation axes 65, respectively. The protruding shafts 66 may be received on corresponding bearings integral to the enclosure 35, for example.

A louver driving source 67 are connected to the protruding shafts 66. The louver driving source 67 may comprise an electric motor, for example. An engaging shaft 68 is formed on each of the vertical louvers 64, for example. The engaging shaft 68 extends in parallel with the corresponding rotation axis 65 at a position offset from the corresponding rotation axis 65. A connecting member 69 is connected to the engaging shafts 68 for relative rotating movement around the respective longitudinal axes of the engaging shafts 68. A driving gear 71 is fixed to the driving shaft of the electric motor. A follower gear 72 is fixed to the protruding shaft 66 of one of the vertical louvers 64 in a manner coaxial with the longitudinal axis of the protruding shaft 66. The driving gear 71 is engaged with the follower gear 72. The driving power of the electric motor is in this manner transferred to the protruding shaft 66 of one vertical louver 64 at a predetermined transmission ratio. The rotating movement of one vertical louver 64 is transmitted to the remaining vertical louvers 64 through the connecting member 69 so as to cause the rotating movement of the remaining vertical louvers 64. The vertical louvers 64 are in this manner caused to rotate.

Figure 7:
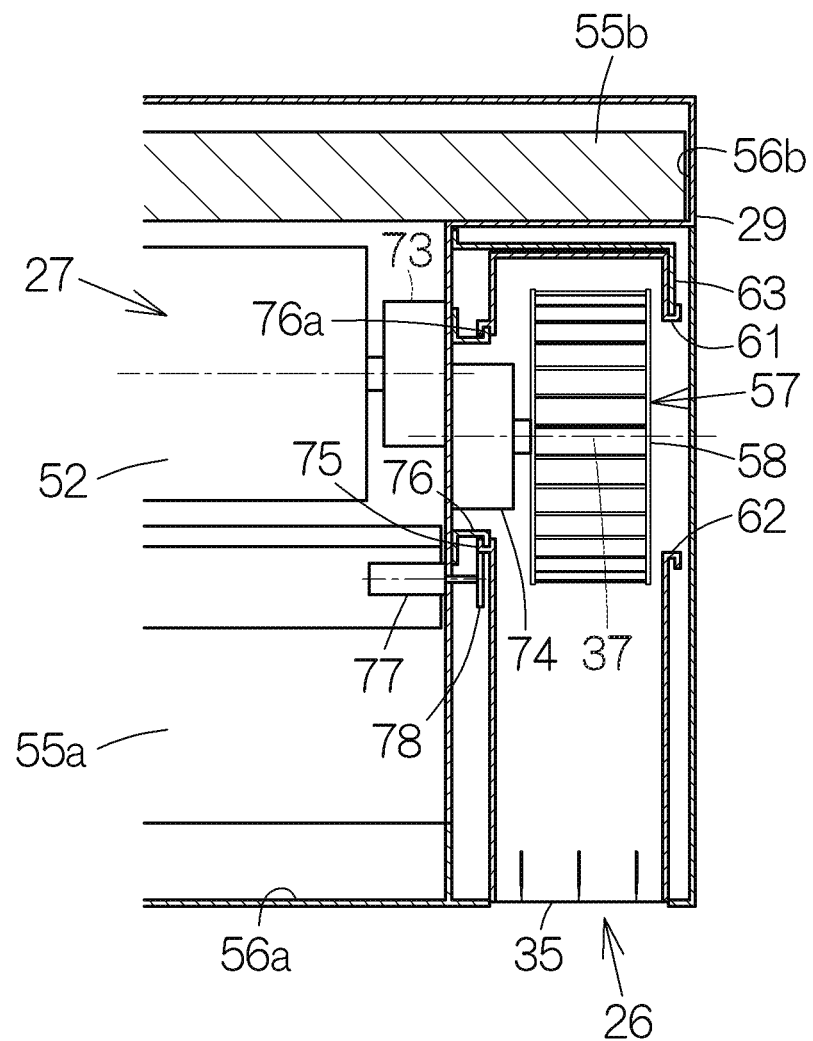
FIG. 7 is a horizontal cross-sectional view taken along the line 7-7 in FIG. 4.

As depicted in FIG. 7, a first fan driving source 73 is connected to the first blower fan 27. The first fan driving source 73 may comprise an electric motor, for example. The rotor 52 is fixedly coupled to the driving shaft of the electric motor in a manner coaxial with the driving shaft. When the first fan driving source 73 operates, the rotor 52 is caused to rotate. Airflow is generated in the interior space of the enclosure body 29. The first fan driving source 73 is fixed to the side wall of the enclosure body 29 from the inside.

Second fan driving sources 74 are connected to the individual second blower fans 57, respectively. The second fan driving source 74 may comprise an electric motor, for example. The rotor 58 is fixedly coupled to the driving shaft of the electric motor in a manner coaxial with the driving shaft. When the second fan driving source 74 operates, the rotor 58 is caused to rotate. Airflow is generated in the interior space of the enclosure 35. The side walls of the enclosure body 29 serve to isolate the airflow in the enclosure 35 from the airflow in the enclosure body 29. The individual second fan driving source 74 is fixed to the corresponding side wall of the enclosure body 29 from the outside, for example.

An annular wall 75 is formed in each of the fan units 26 on the enclosure 35 at the side surface, opposed to the enclosure body 29. The annular wall 75 is coaxial with the annular wall 62. The annular wall 75 is supported on a second bracket 76 for relative rotating movement. The annular wall 75 has the inward surface along the cylindrical surface. An annular flange 76*a* is formed in the second bracket 76 in a manner coaxial with the annular wall 75. The annular flange 76 is received on the inner surface of the annular wall 75 for relative rotating movement. The enclosure 35 is in this manner stably supported at the opposite ends on a pair of the annular walls 62, 75.

Enclosure driving sources 77 are coupled to the enclosure 35, respectively. The enclosure driving sources 77 may comprise an electric motor, for example. A driving gear 78 is fixed to the driving shaft of the electric motor. Teeth are formed on the outer surface of the annular wall 75 for engagement with the driving gear 78. The driving power of the electric motor is transmitted to the enclosure 35 at a predetermined transmission ratio. The enclosure 35 of the individual fan unit 26 is driven to rotate around the horizontal axis in response to the operation of the enclosure driving source 77. The rotating movement of the enclosure 35 enables movement of the individual second air outlet 36 around the corresponding horizontal axis 37. The individual enclosure driving source 77 is fixed to the corresponding side wall of the enclosure body 29 from the inside, for example. The driving shaft of the electric motor may penetrate through the corresponding side wall of the enclosure body 29. The annular walls 62, 75, the first and second brackets 63, 76 and the enclosure driving source 77 in combination provide a driving mechanism designed to change the attitude of the enclosure 35 relative to the enclosure body 29.

Figure 8:
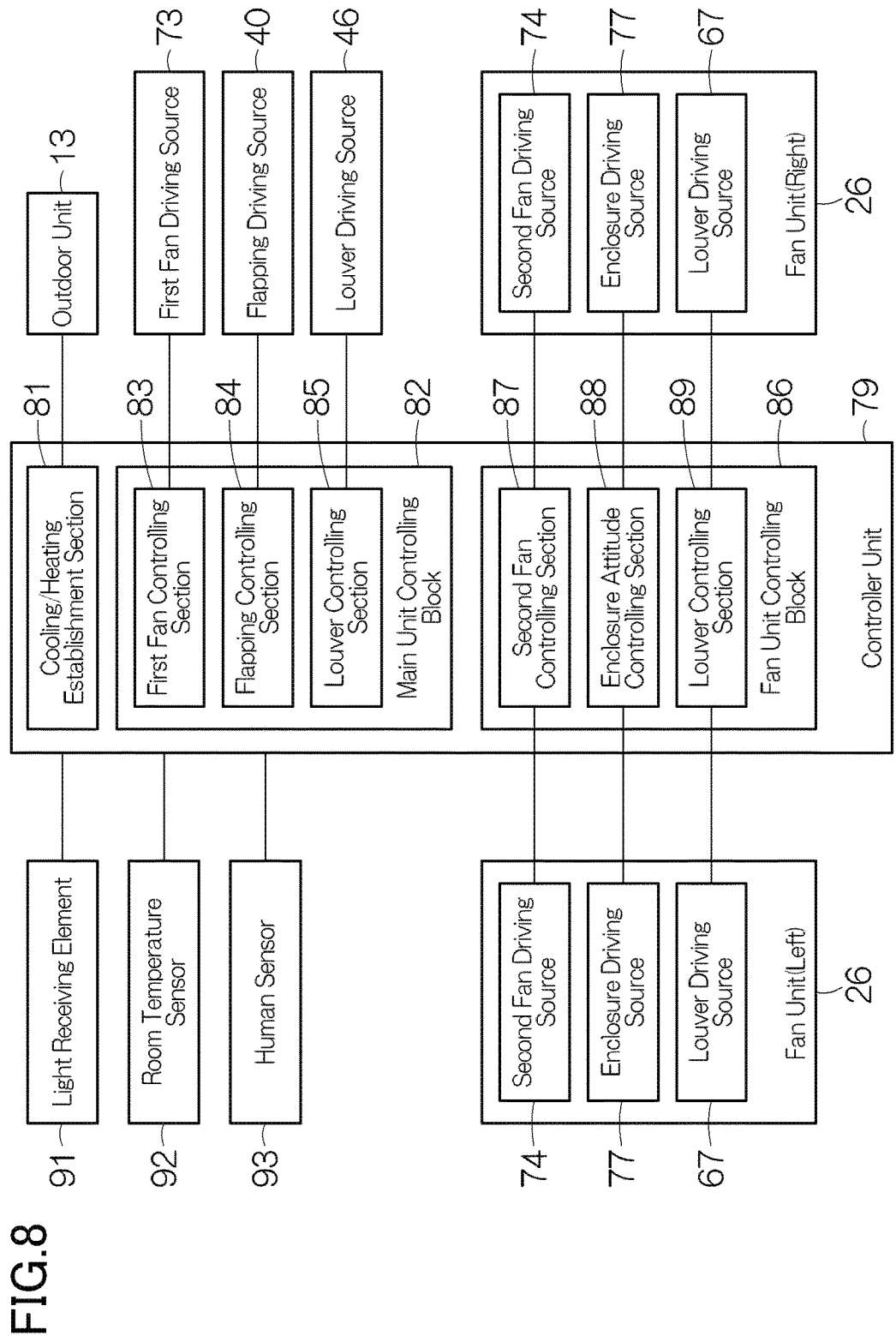
FIG. 8 is a block diagram schematically illustrating a controlling system of the air conditioner.

FIG. 8 schematically illustrates a block diagram of the controlling system of the air conditioner 11. A controller unit 79 includes a cooling/heating establishment section 81. The cooling/heating establishment section 81 is configured to control the operation of the refrigerant circuit 19. The refrigerant circuit 19 selectively conducts the cooling operation or the heating operation under the control of the cooling/heating establishment section 81. The outdoor unit 13 is connected to the cooling/heating establishment section 81. The cooling/heating establishment section 81 controls the operation of the compressor 15, the expansion valve 17 and the four-way valve 18. The cooling/heating establishment section 81 is configured to output control signals to the compressor 15, the expansion valve 17 and the four-way valve 18 for controlling the operation of the compressor 15, the expansion valve 17 and the four-way valve 18. The control signal serves to change the position of the valve at the four-way valve 18, for example.

The controller unit 79 includes a main unit controlling block 82. The main unit controlling block 82 controls the operation of the main unit 25. The main unit controlling block 82 includes a first fan controlling section 83, a flapping controlling section 84 and a louver controlling section 85. The first fan driving source 73 is electrically connected to the first fan controlling section 83. The first fan controlling section 83 controls the operation of the first fan driving source 73. The first fan controlling section 83 is configured to output a first driving signal to the first fan driving source 73 for controlling the operation of the first fan driving source 73. The first fan driving source 73 realizes the start and termination of the operation of the first blower fan 27 as well as the control on the rotation speed of the first blower fan 27 in response to the reception of the first driving signal. The flapping driving source 40 of the main unit 25 is electrically connected to the flapping controlling section 84. The flapping controlling section 84 controls the operation of the flapping driving source 40. The flapping controlling section 84 is configured to output a control signal to the flapping driving source 40 for controlling the operation of the flapping driving source 40. The flapping driving source 40 realizes the control on the orientation of the horizontal flaps 33a, 33b in response to the reception of the control signal. The louver driving source 46 is electrically connected to the louver controlling section 85. The louver controlling section 85 controls the operation of the louver driving source 46. The louver controlling section 85 is configured to output a control signal to the louver driving source 46 for controlling the operation of the louver driving source 46. The louver driving source 46 realizes the control on the orientation of the vertical louvers 43 in response to the reception of the control signal.

The controller unit 79 includes a fan unit controlling block 86. The fan unit controlling block 86 controls the operation of the fan units 26. The fan unit controlling block 86 includes a second fan controlling section 87, an enclosure attitude controlling section 88 and a louver controlling section 89. The second fan driving sources 74 are independently electrically connected to the second fan controlling section 87. The second fan controlling section 87 independently controls the operation of the second fan driving sources 74. The second fan controlling section 83 is configured to separately supply a second driving signal to the individual second fan driving source 74 for controlling the operation of the individual second fan driving source 74. The individual second fan driving source 74 realizes the start and termination of the operation of the corresponding second blower fan 57 as well as the control on the rotation speed of the corresponding second blower fan 57 in response to the reception of the second driving signal. The enclosure driving sources 77 of the fan units 26 are independently electrically connected to the enclosure attitude controlling section 88. The enclosure attitude controlling section 88 controls the operation of the individual enclosure driving sources 77. The enclosure attitude controlling section 88 is configured to separately supply a third driving signal to the individual enclosure driving source 77 for controlling the operation of the individual enclosure driving source 77. The individual enclosure driving source 77 realizes the control on the orientation of the corresponding enclosure 35 in response to the reception of the third driving signal. The louver driving sources 67 are independently electrically connected to the louver controlling section 89. The louver controlling section 85 controls the operation of the individual louver driving sources 46. The louver controlling section 85 is configured to separately supply a control signal to the individual louver driving source 67 for controlling the operation of the individual louver driving source 67. The individual louver driving source 67 realizes the control on the orientation of the corresponding vertical louvers 64 in response to the reception of the control signal.

A light receiving element 91 is connected to the controller unit 79. The light receiving element 91 is configured to receive command signals from a remote controller unit, for example, by air. The command signals serve to specify the operating mode of the air conditioner 11, the set temperature, and the like, for example. The remote controller unit is manipulated to input the operating mode, the set temperature, or the like, to generate the command signals. The list of the operating mode may include "cooling mode", "heating mode", "dehumidifying mode" and "blower mode". The light receiving element 91 is configured to output the received command signals. The command signals are supplied to the cooling/heating establishment section 81, the main unit controlling block 82 and the fan unit controlling block 86, respectively. The cooling/heating establishment section 81, the main unit controlling block 82 and the fan unit controlling block 83 respectively operate in accordance with the operating mode, the set temperature, and the like, specified in the command signals.

A room temperature sensor 92 is connected to the controller unit 79. The room temperature sensor 92 is attached to the indoor unit 12, for example. The room temperature sensor 92 is configured to detect the ambient temperature around the indoor unit 12. The room temperature sensor 92 outputs a temperature signal in accordance with the detected result. The temperature signal serves to specify the room temperature. The temperature signal is supplied to the main unit controlling block 82 and the fan unit controlling block 86, for example. The main unit controlling block 82 and the fan unit controlling block 86 are allowed to refer to the temperature specified in the temperature signal so as to execute the control.

A human sensor 93 is connected to the controller unit 79. The human sensor 93 is attached to the indoor unit 12, for example. The human sensor 93 is configured to detect the existence of the human being, the location of the human being, or the like. The human sensor 93 outputs a detect signal in accordance with the detected result. The detect signal serves to specify the presence of the human being, the location of the human being, or the like. The detect signal is supplied to the cooling/heating establishment section 81, the main unit controlling block 82 and the fan unit controlling block 86, for example. The cooling/heating establishment section 81, the main unit controlling block 82 and the fan unit controlling block 86 are allowed to refer to the presence, the location, or the like, of the human being specified in the detect signal so as to execute the control.

It should be noted that the controller unit 79 may comprise a processing circuit such as a microprocessor unit (MPU), for example. A non-volatile storage unit may be built-in or externally attached to the processing circuit, for example. The storage unit may store a predetermined controlling program. The processing circuit executes the controlling program so as to function as the controller unit 79.

Next, a description will be made on the operation of the air conditioner 11. Assuming that a first mode of the cooling operation is selected, for example, the cooling/heating establishment section 81 outputs a control signal for establishing the cooling operation. The control signals are supplied to the compressor 15, the expansion valve 17, the four-way valve 18, and the like. The four-way valve 18 is controlled to connect the second port 18b and the third port 18c to each other and the first port 18a and the fourth port 18d to each other. The compressor 15 operates to circulate the refrigerant through the refrigerant circuit 19. A cool air is thus generated at the indoor heat exchanger 14. The temperature of the cool air is lower than at least the temperature of the room air. The compressor 15 is controlled to operate in accordance with the room temperature detected at the room temperature sensor 92. In addition, when the human sensor 93 keeps detecting the nonexistence of the human being in the room for a predetermined duration of time, the compressor 15 may be made inoperative.

Figure 9:
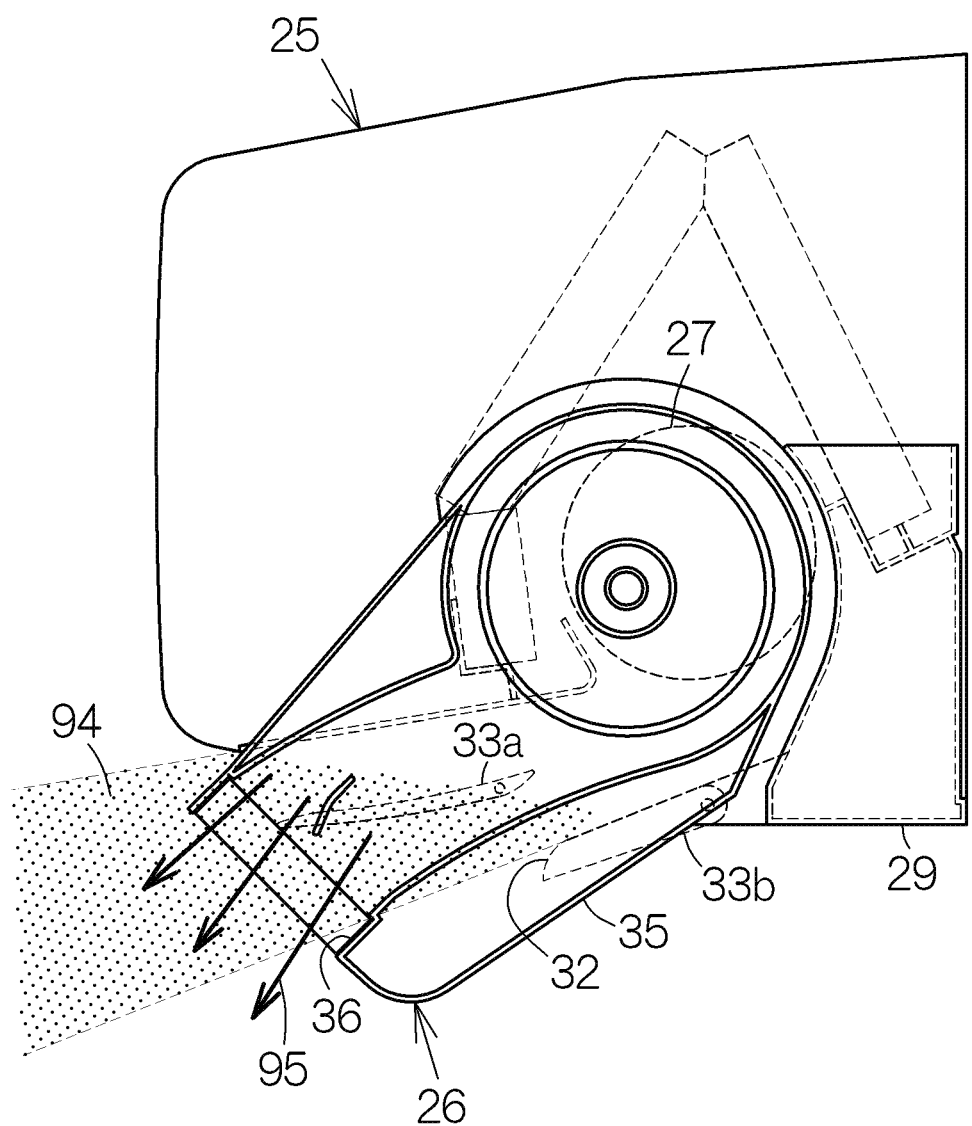
FIG. 9 is a schematic view illustrating the attitude of the horizontal flaps and the attitude of the fan units when a first mode of the cooling operation has been selected.

The first fan controlling section 83 of the main unit controlling block 82 outputs the first driving signal for driving the first blower fan 27. The first driving signal is supplied to the first fan driving source 73. The first blower fan 27 is driven to rotate. Airflow of the cooling air is discharged out of the first air outlet 32. Here, the flapping controlling section 84 of the main unit controlling block 82 outputs the control signal for driving the horizontal flaps 33a, 33b of the main unit 25. The control signal is supplied to the flapping driving source 40. As depicted in FIG. 9, the horizontal flaps 33a, 33b are forced to take the horizontal attitude. The horizontal flaps 33a, 33b serve to guide the discharge of the airflow 94 from the first air outlet 32 in the horizontal direction. The airflow 94 of the cool air is discharged out of the first air outlet 32 in the horizontal direction.

The second fan controlling section 87 of the fan unit controlling block 86 outputs the second driving signals for driving the individual second blower fans 57. The second driving signals are supplied to the individual second fan driving source 74, respectively. The individual second blower fans 57 are driven to rotate. A room air is sucked into the interior space inside the enclosure 35 through the second air inlet 38 and the opening 61 in the respective fan unit 26. The temperature of the room air is equal to the room temperature. The sucked room air is discharged out of the second air outlet 36 of the respective fan unit 26 as it is, specifically without being subjected to heat exchange of the indoor heat exchanger 14. Here, the enclosure attitude controlling section 88 of the fan unit controlling block 86 outputs the third driving signals for driving the annular walls 62, 75 relative to the first and second brackets 63, 76. The third driving signals are supplied to the enclosure driving sources 77 in the individual fan units 26, respectively. As depicted in FIG. 9, the enclosure 35 is forced to take an ascendant attitude, shifted from the horizontal attitude. The enclosure 35 serves to guide the discharge of airflow 95 from the second air outlet 36 in an ascendant direction, inclined forward beyond the horizontal direction. The airflow 95 of the room air is discharged out of the second air outlet 36 in the descendant direction.

Figure 10:
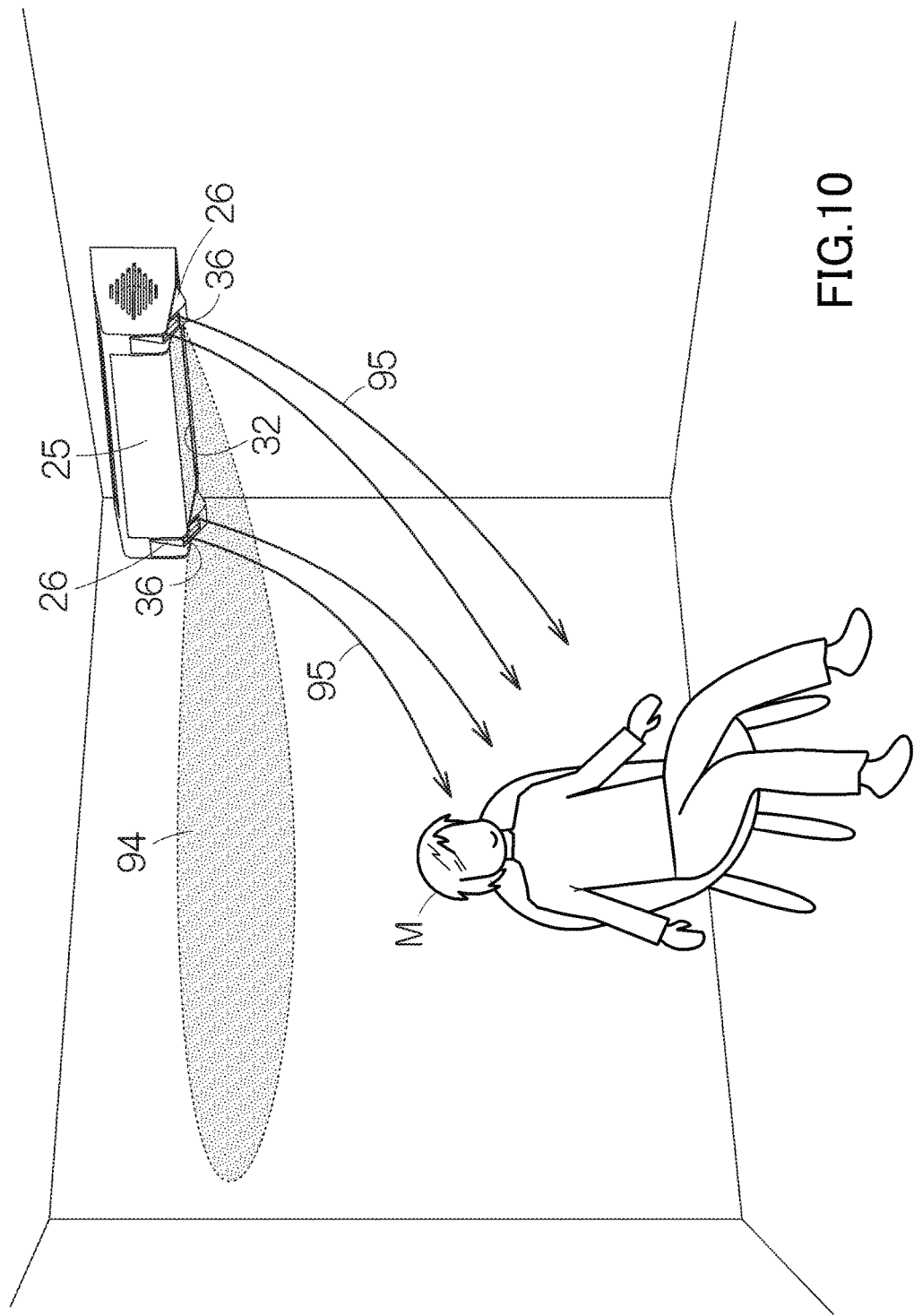
FIG. 10 is a schematic view illustrating the flow of air in a room when the first mode of the cooling operation has been selected.

As depicted in FIG. 10, the indoor unit 12 is in general mounted at a relatively high position in the room. When the airflow 94 of the cool air is guided in the horizontal direction, the cool air is allowed to fall down from the higher level toward the floor. The cool air is gradually accumulated on the floor in the room. Here, the fan units 26 serve to direct the airflow 95 of the room air directly to the human being M in the room. The fan units 26 are allowed to function as a simple fan or blower during the cooling operation. The airflow 95 of the room air is prevented from being mixed with the cool air, so that the human being M in the room is allowed to feel a comfortable cooled condition. The human being M is capable of enjoying the cooling effect resulting from not only a reduction in the room temperature but also heat radiation from the skin through the contact of the airflow 95.

In addition, the enclosure attitude controlling section 88 determines the attitude of the enclosure 35 in the individual fan unit 26 based on the detect signal output from the human sensor 93. Likewise, the louver controlling section 89 of the individual fan unit 26 determines the orientation of the vertical louvers 64 based on the detect signal output from the human sensor 93. The human sensor 93 thus contributes to establishment of the airflow 95 from the second air outlet 36 directed to the human being M in the room with a high accuracy. The human sensor 93 may be utilized to allow the airflow 95 of the room air to follow the movement of the human being M in the room. Even when the human being M moves in the room, the airflow 95 of the room air keeps reaching the human being M moving in the room. The human being M in the room is reliably allowed to enjoy the cooling effect resulting from the contact of the airflow 95. The enclosure attitude controlling section 88 separately and independently controls the attitudes of the enclosures 35, so that the attitudes of the enclosures 35 can be controlled appropriately in accordance with the number and locations of the human being M in the room. The separate individual fan units 26 are capable of forming the separate airflow 95 of the room air accurately directed to the human being M.

Figure 11:
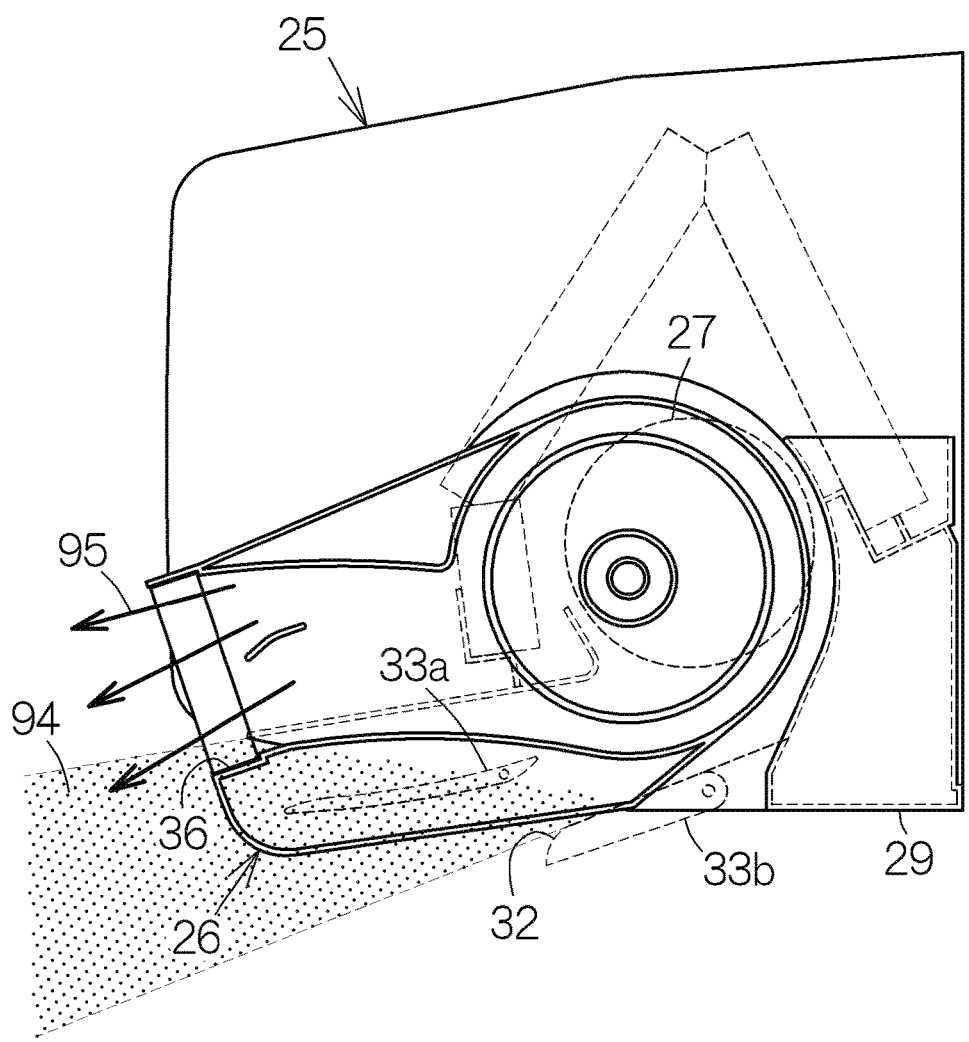
FIG. 11 is a schematic view illustrating the attitude of the horizontal flaps and the attitude of the fan units when a second mode of the cooling operation has been selected.

Next, assuming that a second mode of the cooling operation is selected, the cooling/heating establishment section 81 operates to establish the cooling operation in the refrigerant circuit 19 in the aforementioned manner. The main unit controlling block 82 operates to discharge the airflow 94 of the cool air from the first air outlet 32 in the horizontal direction in the manner as described above. And, the fan units 26 are controlled to discharge the airflow 95 of the room air from the second air outlet 36. Here, the third driving signals from the enclosure attitude controlling section 88 serve to determine the attitude of the enclosures 35 for discharging the airflow 95 of the room air in the horizontal direction, as depicted in FIG. 11.

Figure 12:
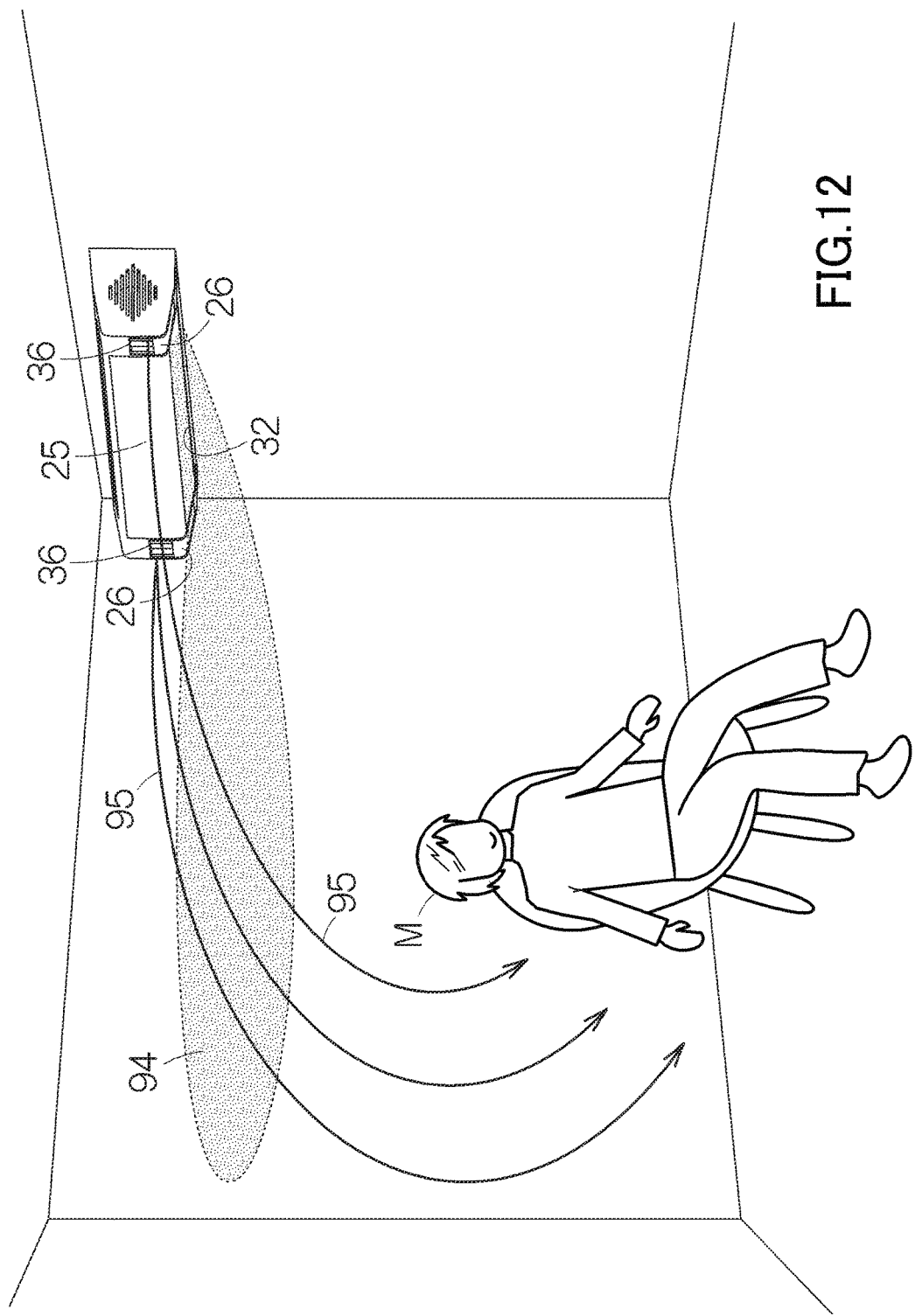
FIG. 12 is a schematic view illustrating the flow of air in the room when the second mode of the cooling operation has been selected.

Here, if the flow rate of the airflow 95 of the second air outlet 36 is larger than the flow rate of the airflow 94 of the first air outlet 32, the airflow 95 having a larger flow rate can be utilized to restrict or guide the airflow 94 having a smaller flow rate, as depicted in FIG. 12, for example. The airflow 95 of the room air can be utilized to control the orientation and movement of the airflow 94 of the cool air. The cool air can be conveyed to a desired location in the room. Here, the airflow 95 from the second air outlet 36 flows along the ceiling and the wall to moderately fall onto the floor together with the airflow 94 of the cool air. A moderate flow of air is generated along the floor in the room. The human being M in the room is allowed to enjoy a comfortable cooled condition with a slow airstream of the convection. The fan units 26 may take an attitude for discharging the airflow 95 of the room air in an ascendant direction, headed upward beyond the horizontal direction, when the fan units 26 are utilized to generate a moderate flow of air.

Figure 13:
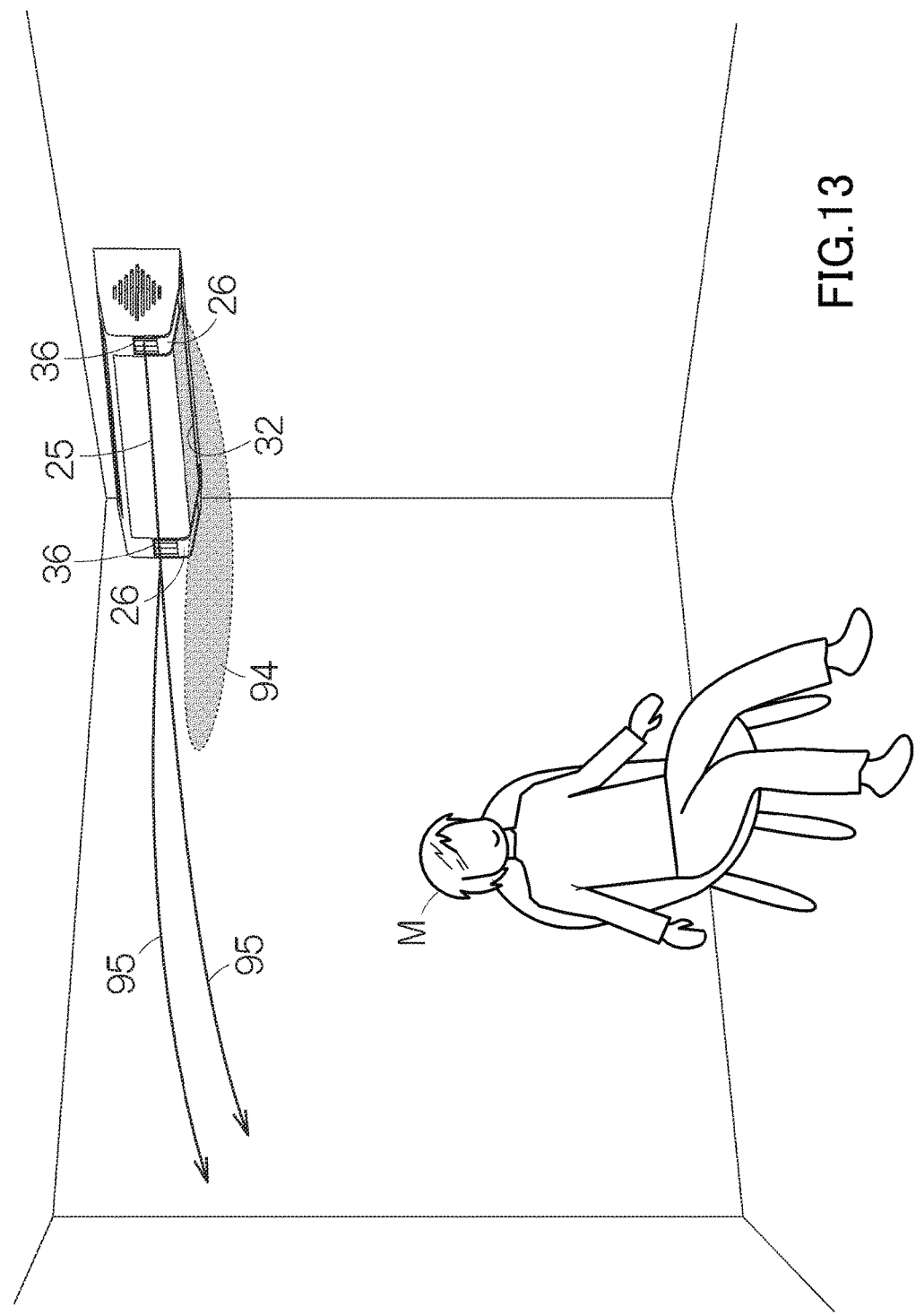
FIG. 13 is a schematic view illustrating the flow of air in the room when the third mode of the cooling operation has been selected.

As depicted in FIG. 13, the flow rate of the airflow 94 of the first air outlet 32 gets remarkably smaller when the room temperature is kept at the set temperature, for example. Here, a third mode of the cooling operation can be established. The louver controlling section 89 of the fan unit controlling block 86 serves to control the orientation of the vertical louvers 64 at the second air outlet 36 in the third mode. The front ends of the vertical louvers 64 are directed toward the main unit 25 in the respective fan units 26. Accordingly, the airflows 95 of the room air are discharged out from the second air outlets 36 so as to get closer to each other. It should be noted that the horizontal flaps 33a, 33b of the first air outlet 32 and the enclosures 35 take attitudes identical to those of the second mode.

As depicted in FIG. 13, when the airflow 95 having a larger flow rate has been discharged out from the second air outlets 36, the airflow 94 of the cool air is caught in the airflow 95 of the room air having a larger flow rate. Accordingly, the airflow 94 of the cool air is conveyed farther with the assistance of the airflow 95 of the room air. Even when the flow rate of the airflow 94 of the cool air gets smaller, the airflow 94 of the cool air can reach farther locations. Even though the flow rate of air is reduced, the room is cooled in an efficient manner. On the other hand, if the airflow 94 of the cool air is discharged solely out of the first air outlet 32, the airflow 94 of the cool air having a smaller flow rate cannot sufficiently spread in the room. The room atmosphere suffers from an unequal temperature distribution.

When the heating operation is selected, for example, the cooling/heating establishment section 81 outputs a control signal for establishing the heating operation. The control signals are supplied to the compressor 15, the expansion valve 17, the four-way valve 18, and the like. The four-way valve 18 is controlled to connect the second port 18b and the fourth port 18d to each other and the first port 18a and the third port 18c to each other. The compressor 15 operates to circulate the refrigerant through the refrigerant circuit 19. A warm air is thus generated at the indoor heat exchanger 14. The temperature of the warm air is higher than at least the temperature of the room air. The compressor 15 is controlled to operate in accordance with the room temperature detected at the room temperature sensor 92. In addition, when the human sensor 93 keeps detecting the nonexistence of the human being in the room for a predetermined duration of time, the compressor 15 may be made inoperative.

Figure 14:
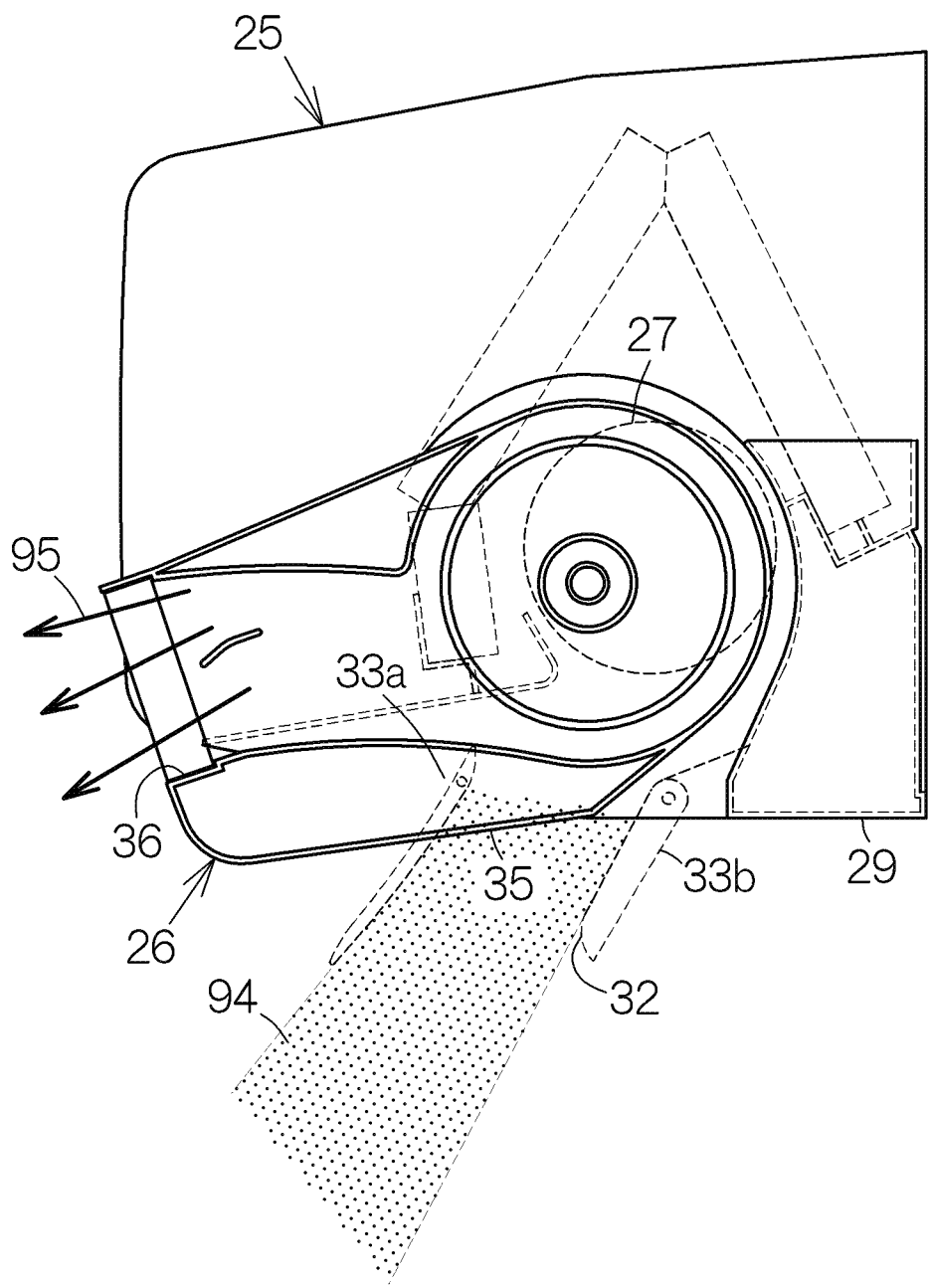
FIG. 14 is a schematic view illustrating the attitude of the horizontal flaps and the attitude of the fan units when a first mode of the heating operation has been selected.

The warm air is discharged out of the first air outlet 32 in response the rotation of the first blower fan 27 in the heating operation. Here, the flapping controlling section 84 of the main unit controlling block 82 supplies the control signal to the flapping driving source 40 so as to establish a descendant attitude of the horizontal flaps 33a, 33b, as depicted in FIG. 14. The horizontal flaps 33a, 33b serve to guide the discharge of the airflow 94 through the first air outlet 32 in the descendant direction to the floor. The airflow 94 of the warm air is discharged out of the first air outlet 32 in the descendant direction.

When the heating operation has begun, the controller unit 79 conducts a first mode of the heating operation. The enclosure attitude controlling section 88 of the fan unit controlling block 86 supplies the control signal to the enclosure driving source 77 so as to change the attitude of the enclosures 35 to the horizontal attitude, as depicted in FIG. 14. The enclosures 35 serve to guide the discharge of the airflow 95 from the second air outlet 36 in the horizontal direction. The airflow 95 of the room air is discharged out of the second air outlet 36 in the horizontal direction. The fan units 26 keep the attitude designed for the discharge in the horizontal direction until the room temperature reaches a predetermined temperature lower than the set temperature, for example. The room temperature can be detected at the room temperature sensor 92.

Figure 15:
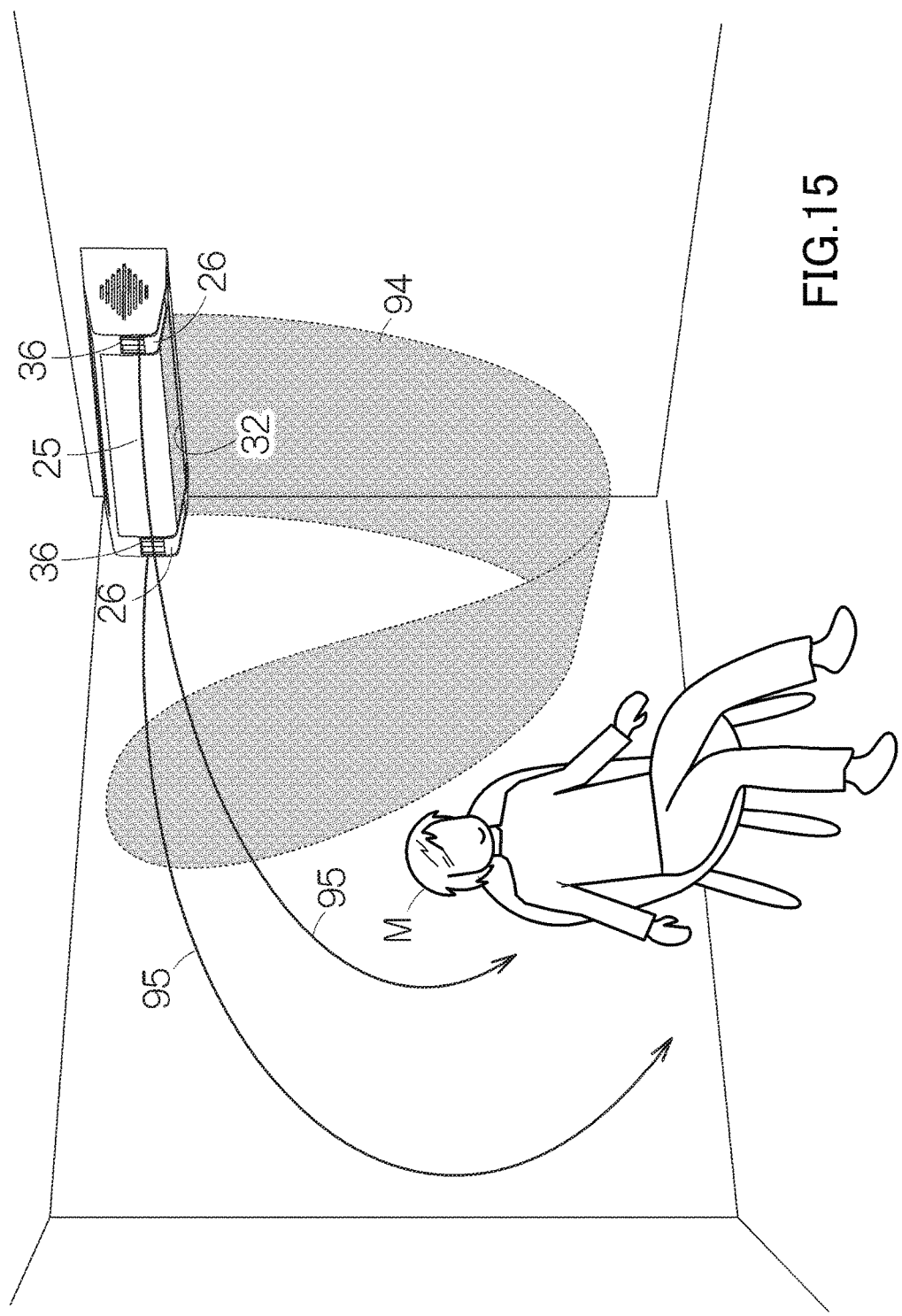
FIG. 15 is a schematic view illustrating the flow of air in the room when the first mode of the heating operation has been selected.

When the airflow 94 of the warm air is guided in the descendant direction, the warm air is forced to flow downward to the floor. As depicted in FIG. 15, the warm air tends to immediately lift up from the floor toward the ceiling when the room temperature is relatively low, for example. Here, the fan units 26 serve to generate a convection or an airflow in the room catching the warm air flowing upward. The caught warm air is caused to fall downstream toward the floor. The warm air is allowed to sufficiently flow into the lower space of the room. Even though the entire space in the room cannot be heated, the human being M in the room feels warmness.

Figure 16:
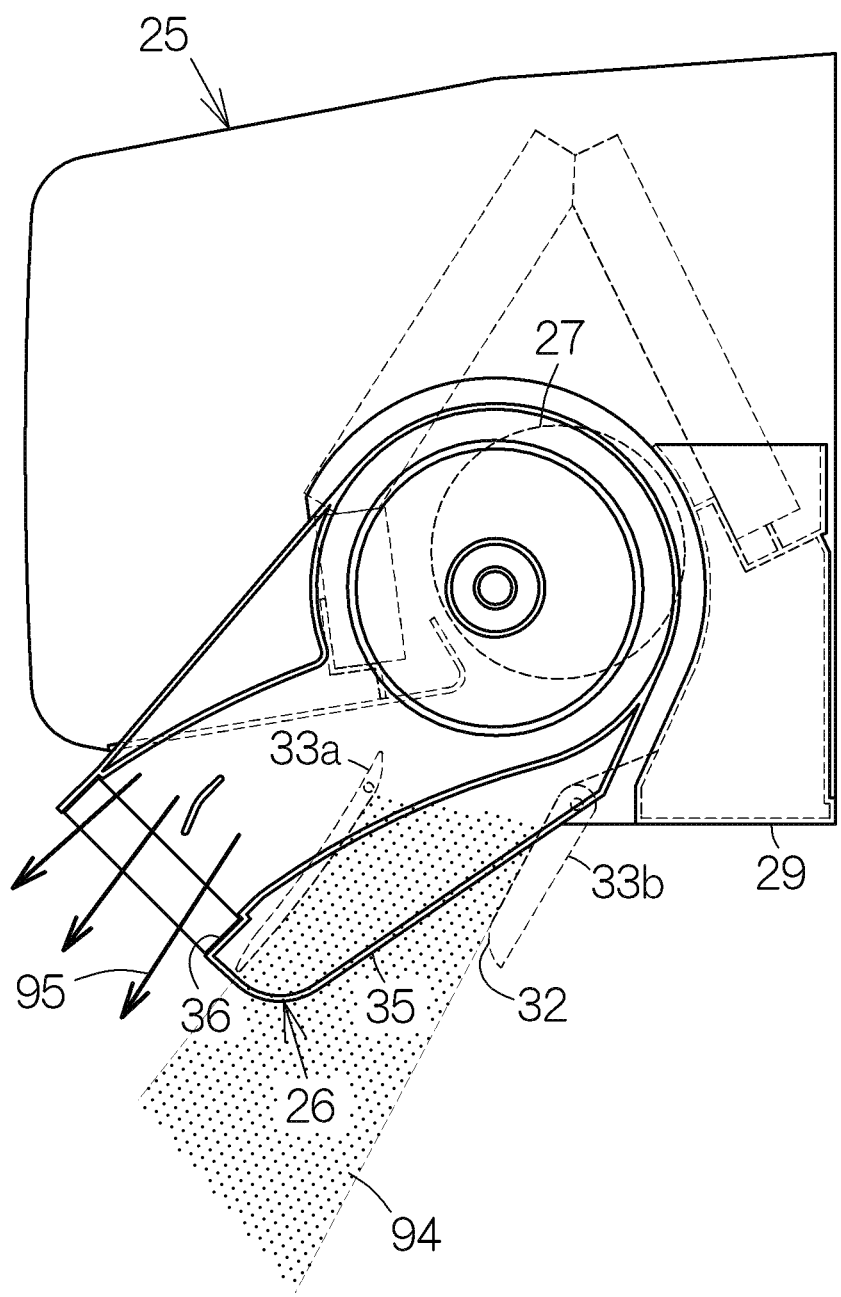
FIG. 16 is a schematic view illustrating the attitude of the horizontal flaps and the attitude of the fan units when a second mode of the heating operation has been selected.
Figure 17:
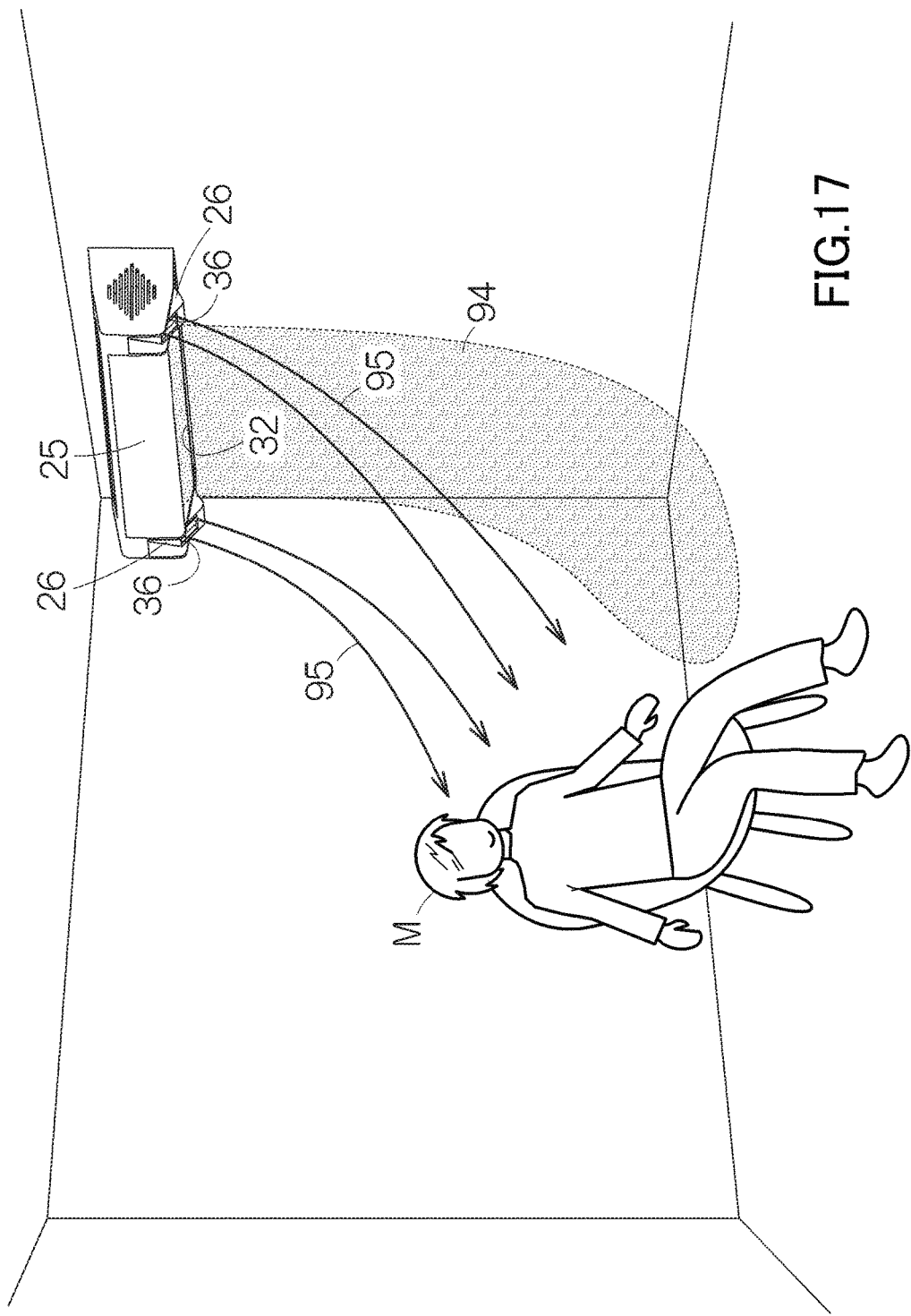
FIG. 17 is a schematic view illustrating the flow of air in the room when the second mode of the heating operation has been selected.

When the room temperature has reached the predetermined temperature lower than the set temperature, the controller unit 79 operates to establish a second mode of the heating operation. As depicted in FIG. 16, the enclosure attitude controlling section 88 serves to establish a descendant attitude of the enclosures 35, for example. The enclosures 35 of the fan units 26 establish the attitude for discharging the airflow 95 in the descendant direction from a position higher than the first air outlet 32 in the same manner as the horizontal flaps 33a, 33b. The airflow 95 of the fan units 26 flows downward above the airflow 94 of the warm air, as depicted in FIG. 17, for example. The airflow 95 of the fan units 26 serves to hold the warm air against the floor. The airflow 95 thus prevents the warm air from flowing upward. The human being M in the room is allowed to feel the warmness at his/her feet. The room temperature has reached the predetermined temperature, although lower than the set temperature, the human being M in the room can avoid feeling coldness resulting from the contact of the airflow 95 of the room air.

The air conditioner 11 allows the main unit 25 to discharge the airflow 94 of the cool air or the warm air out of the first air outlet 32. The airflow 95 of the room air is discharged out of the second air outlets 36 of the fan units 26. The airflow 95 of the room air can be utilized to control the direction and/or movement of the airflow 94 of the cool air or the warm air. The cool air or the warm air is conveyed to the desired locations in the room. The temperature environment is in this manner efficiently enhanced. In this case, the second air outlets 36 of the fan units 26 are allowed to move relative to the first air outlet 32 of the main unit 25. Accordingly, the airflow 95 of the room air can be guided in a desired direction. The direction of the airflow 95 serves to appropriately control the direction and/or movement of the airflow 94 of the cool air or the warm air.

The second air outlets 36 of the fan units 26 are located ahead of the first air outlet 32 of the main unit 25 in the air conditioner 11. The second air outlets 36 are arranged downstream of the burble point of the horizontal fraps 33a, 33b along the stream of the airflow 94. Accordingly, the airflow 95 of the fan units 26 is allowed to flow out of the second air outlets 36 without being hindered with the enclosure body 29 and/or the outer panel 31.

In addition, the rear section 55b of the indoor heat exchanger 14 has the width larger than the width of the rear section 55b of the indoor heat exchanger 14. Spaces behind the fan units 26 are effectively utilized to accommodate the rear section 55b of the indoor heat exchanger 14. Accordingly, the indoor heat exchanger 14 is prevented from a reduction in the width to the utmost irrespective of the disposition of the fan units 26.

Figure 18:
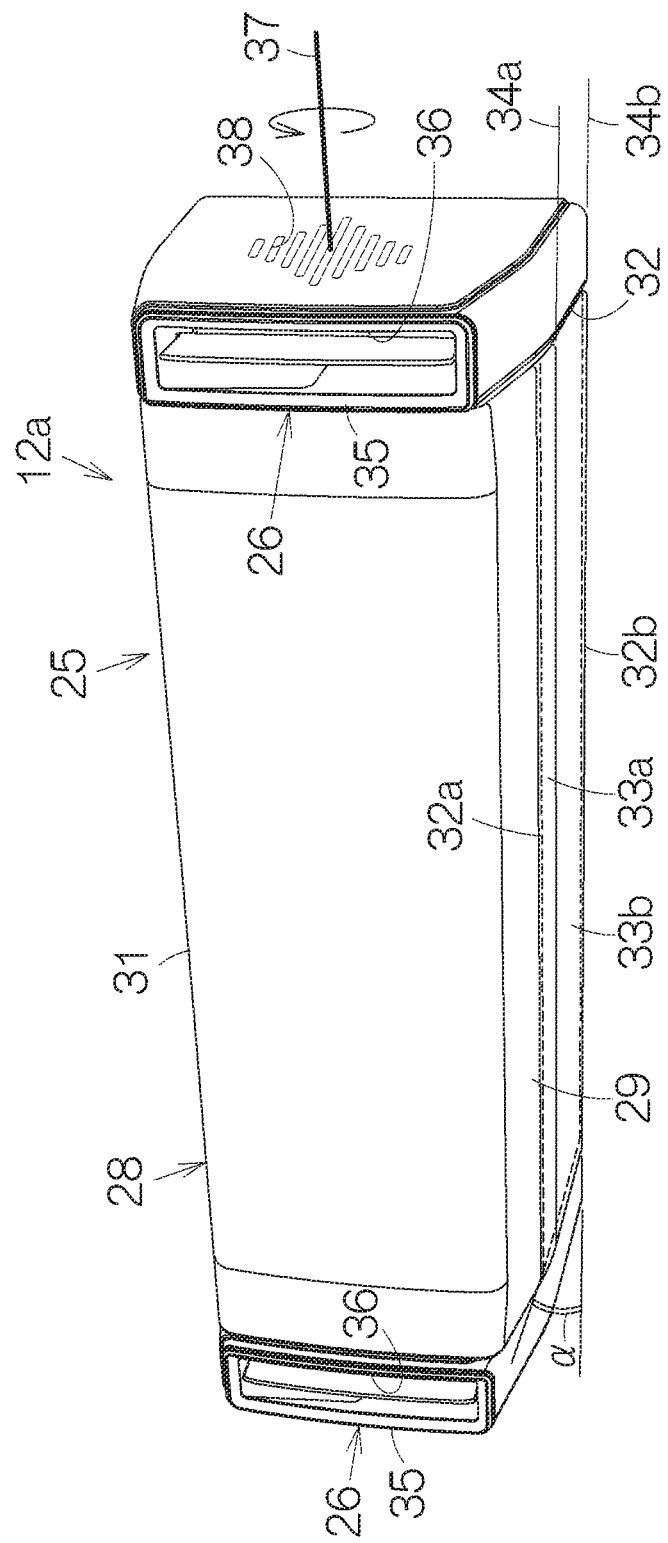
FIG. 18 is a perspective view schematically illustrating the structure of an indoor unit according to a second embodiment.

FIG. 18 schematically illustrates the indoor unit 12a according to a second embodiment. The side surfaces of the enclosure body 29 defined along a pair of vertical planes perpendicular to the horizontal axes 34a, 34b in this second embodiment. The enclosure body 29 terminates at the vertical planes. The fan units 26 are located on the outer surface of the vertical planes. Accordingly, the rotary movement of the fan units 26 is not hindered with the outer panel 31. In addition, the second air outlet 36 is made larger in size in the respective fan units 26. The other structure and components are identical to those of the aforementioned indoor unit 12 according to the first embodiment. In figures, identical reference numerals are attached to the structure and components identical to those of the aforementioned indoor unit 12 according to the first embodiment.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An air conditioner comprising:
an indoor unit comprising:
a first enclosure comprising a first airflow passage in which a heat exchanger and a first blower fan are disposed, the first enclosure comprising a first air outlet at an end of the first airflow passage;
a second enclosure disposed on a first side of the first enclosure, the second enclosure comprising a second air airflow passage in which a second blower fan is disposed, the second airflow passage being distinct from the first airflow passage, the second enclosure comprising a second air outlet at an end of the second airflow passage; and
a third enclosure disposed on a second side of the first enclosure, the third enclosure comprising a third airflow passage in which a third blower fan is disposed, the third airflow passage being distinct from the first airflow passage and the second airflow passage, the second side being opposite the first side of the first enclosure, the third enclosure defining a third air outlet at an end of the third airflow passage; and
a controller circuit comprising:
a cooling operation unit configured to control generation of a cool air through the heat exchanger in the first airflow passage, the cool air being lower in temperature than a room temperature air;
a first fan controller configured to control the first blower fan to induce an airflow of the cool air in the first airflow passage, the airflow of the cool air being discharged through the first air outlet;
a second fan controller configured to control:
the second blower fan to induce a first airflow of the room temperature air in the second airflow passage, the first airflow of the room temperature air being discharged through the second air outlet, and
the third blower fan to induce a second airflow of the room temperature air in the third airflow passage, the second airflow of the room temperature air being discharged through the third air outlet; and
an enclosure orientation controller configured to control driving mechanisms driving the second enclosure and the third enclosure to change orientations of the first airflow and the second airflow of the room temperature air, guiding the airflow of the cool air.

2. The air conditioner according to claim 1, wherein the enclosure orientation controller is configured to determine the orientations of the second enclosure and the third enclosure based on a detect signal output from a human sensor detecting a presence of a human being in a room.

3. The air conditioner according to claim 1, wherein the enclosure orientation controller is further configured to control the orientations of the second enclosure and the third enclosure differently from each other.

4. The air conditioner according to claim 1, wherein the enclosure orientation controller is configured to determine the orientations of the second enclosure and the third enclosure in an orientation enabling the first airflow and the second airflow of the room temperature air running in a horizontal direction or a descendant direction from the second air outlet and the third air outlet when the airflow of the cool air is blown in a horizontal direction from the first air outlet.

5. The air conditioner according to claim 4, wherein the second fan controller is configured to set a first flow rate of the first airflow of the room temperature air and a second flow rate of the second airflow of the room temperature air to be larger than that of the airflow of the cool air.

6. The air conditioner according to claim 1, wherein the indoor unit further comprises an airflow directing mechanism disposed at the first air outlet for directing the airflow of the cool air, the enclosure orientation controller is configured to control operation of the driving mechanisms in a manner interlocked with operation of the airflow directing mechanism.

\* \* \* \* \*